United States Patent
Xu et al.

(10) Patent No.: US 10,997,433 B2
(45) Date of Patent: May 4, 2021

(54) REAL-TIME DETECTION OF LANES AND BOUNDARIES BY AUTONOMOUS VEHICLES

(71) Applicant: NVIDIA Corporation, San Jose, CA (US)

(72) Inventors: Yifang Xu, San Jose, CA (US); Xin Liu, Pleasanton, CA (US); Chia-Chih Chen, San Jose, CA (US); Carolina Parada, Boulder, CO (US); Davide Onofrio, San Francisco, CA (US); Minwoo Park, Cupertino, CA (US); Mehdi Sajjadi Mohammadabadi, Santa Clara, CA (US); Vijay Chintalapudi, Sunnyvale, CA (US); Ozan Tonkal, Munich (DE); John Zedlewski, San Francisco, CA (US); Pekka Janis, Uusimaa (FI); Jan Nikolaus Fritsch, Santa Clara, CA (US); Gordon Grigor, San Francisco, CA (US); Zuoguan Wang, Los Gatos, CA (US); I-Kuei Chen, Milpitas, CA (US); Miguel Sainz, Palo Alto, CA (US)

(73) Assignee: NVIDIA Corporation, San Tomas, CA (US)

( * ) Notice: Subject to any disclaimer, the term of this patent is extended or adjusted under 35 U.S.C. 154(b) by 0 days.

(21) Appl. No.: 16/286,329

(22) Filed: Feb. 26, 2019

(65) Prior Publication Data

US 2019/0266418 A1    Aug. 29, 2019

Related U.S. Application Data

(60) Provisional application No. 62/636,142, filed on Feb. 27, 2018.

(51) Int. Cl.
*G06K 9/00* (2006.01)
*G06K 9/32* (2006.01)
(Continued)

(52) U.S. Cl.
CPC ....... *G06K 9/00798* (2013.01); *G05D 1/0088* (2013.01); *G05D 1/0221* (2013.01);
(Continued)

(58) Field of Classification Search
None
See application file for complete search history.

(56) References Cited

U.S. PATENT DOCUMENTS 10,157,331 B1    12/2018  Tang et al.
2004/0252864 A1  12/2004  Chang et al.
(Continued)

FOREIGN PATENT DOCUMENTS

EP    1 930 863 A2    6/2008
KR    20120009590 A   2/2012
(Continued)

OTHER PUBLICATIONS

Towards End-to-End Lane Detection: an Instance Segmentation Approach. Neven et al. (Year: 2018).*
(Continued)

*Primary Examiner* — Delomia L Gilliard
(74) *Attorney, Agent, or Firm* — Shook, Hardy & Bacon, L.L.P.

(57) ABSTRACT

In various examples, sensor data representative of an image of a field of view of a vehicle sensor may be received and the sensor data may be applied to a machine learning model. The machine learning model may compute a segmentation mask representative of portions of the image corresponding to lane markings of the driving surface of the vehicle. Analysis of the segmentation mask may be performed to
(Continued)

determine lane marking types, and lane boundaries may be generated by performing curve fitting on the lane markings corresponding to each of the lane marking types. The data representative of the lane boundaries may then be sent to a component of the vehicle for use in navigating the vehicle through the driving surface.

22 Claims, 22 Drawing Sheets

(51) Int. Cl.
    *G06T 7/10* (2017.01)
    *G05D 1/00* (2006.01)
    *G06N 3/08* (2006.01)
    *G05D 1/02* (2020.01)
    *G06K 9/46* (2006.01)
    *G06K 9/48* (2006.01)
    *G06K 9/62* (2006.01)

(52) U.S. Cl.
    CPC ....... *G06K 9/00718* (2013.01); *G06K 9/3233* (2013.01); *G06K 9/4604* (2013.01); *G06K 9/4638* (2013.01); *G06K 9/48* (2013.01); *G06K 9/6274* (2013.01); *G06N 3/084* (2013.01); *G06T 7/10* (2017.01); *G06K 2009/484* (2013.01)

(56) References Cited

U.S. PATENT DOCUMENTS

| | | | |
|---|---|---|---|
| 2009/0256840 A1* | 10/2009 | Varadhan | G06T 15/20 345/419 |
| 2016/0247290 A1* | 8/2016 | Liu | G06K 9/00791 |
| 2016/0321074 A1 | 11/2016 | Hung et al. | |
| 2017/0220876 A1 | 8/2017 | Gao et al. | |
| 2017/0344808 A1 | 11/2017 | El-Khamy et al. | |
| 2018/0089833 A1* | 3/2018 | Lewis | G06T 7/564 |
| 2018/0121273 A1 | 5/2018 | Fortino et al. | |
| 2018/0188059 A1* | 7/2018 | Wheeler | B60W 40/04 |
| 2018/0232663 A1 | 8/2018 | Ross et al. | |
| 2018/0349746 A1 | 12/2018 | Vallespi-Gonzalez | |
| 2018/0370540 A1 | 12/2018 | Yousuf et al. | |
| 2018/0373980 A1 | 12/2018 | Huval | |
| 2019/0066328 A1* | 2/2019 | Kwant | G06T 7/75 |
| 2019/0102646 A1 | 4/2019 | Redman et al. | |
| 2019/0147610 A1 | 5/2019 | Frossard et al. | |
| 2020/0143205 A1 | 5/2020 | Yao et al. | |

FOREIGN PATENT DOCUMENTS

| | | | | |
|---|---|---|---|---|
| WO | WO-2016183074 A1 * | 11/2016 | | G06T 3/40 |
| WO | 2018/002910 A1 | 1/2018 | | |

OTHER PUBLICATIONS

Real-time category-based and general obstacle detection for autonomous driving Garnett (Year: 2017).*
"Systems and Methods for Safe and Reliable Autonomous Vehicles", U.S. Appl. No. 62/584,549, filed Nov. 10, 2017.
"System and Method for Controlling Autonomous Vehicles", U.S. Appl. No. 62/614,466, filed Jan. 17, 2018.
"System and Method for Safe Operation of Autonomous Vehicles", U.S. Appl. No. 62/625,351, filed Feb. 2, 2018.
"Conservative Control for Zone Driving of Autonomous Vehicles", U.S. Appl. No. 62/628,831, filed Feb. 9, 2018.
"Systems and Methods for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 62/630,445, filed Feb. 14, 2018.
"Methods for accurate real-time object detection and for determining confidence of object detection suitable for autonomous vehicles", U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"What is polyline?", Webopedia Definition, Accessed Feb. 21, 2019 at: https://www.webopedia.com/TERM/P/polyline.html.
"Polynomial curve fitting", 12 pages. Accessed Feb. 21, 2019 at: https://www.mathworks.com/help/matlab/ref/polyfit.html.
"Eural spiral", wikipedia.org, 10 pages. Accessed Feb. 21, 2019 at: https://en.wikipedia.org/wiki/Euler_spiral.
Joffe, Sergey et al., "Batch Normalization: Accelerating Deep Network Training by Reducing Internal Covariate Shift", Mar. 2, 2015, 11 pages. Available at: https://arxiv.org/abs/1502.03167.
Deshpande, Adit, "A Beginner's Guide to Understanding Convolutional Neural Networks", Jul. 20, 2016, 13 pages. Available at: https://adeshpande3.github.io/A-Beginner's-Guide-To-Understanding-Convolutional-Neural-Networks/.
"What are deconvolutional layers?", Data Science Stack Exchange, 26 pages. Accessed Feb. 21, 2019 at: https://datascience.stackexchange.com/questions/6107/what-are-deconvolutional-layers.
Chilamkurthy, Sasank, "A 2017 Guide to Semantic Segmentation with Deep Learning", Qure.ai Blog, Jul. 5, 2017, 16 pages. Available at: http://blog.qure.ai/notes/semantic-segmentation-deep-learning-review#sec-1.
Kingma, Diederick P. et al., "Adam: A Method for Stochastic Optimization", published as a conference paper at ICLR 2015, 15 pages. Available at: http://blog.qure.ai/notes/semantic-segmentation-deep-learning-review#sec-1.
"F1 score", wikipedia.org, 3 pages. Accessed Feb. 21, 2019 at: https://en.wikipedia.org/wiki/F1_score.
Virgo, Michael, "Lane Detection with Deep Learning (Part 1)", May 9, 2017, 10 pages. Available at: https://towardsdatascience.com/lane-detection-with-deep-learning-part-1-9e096f3320b7.
Huval, Brody et al., "An Empirical Evaluation of Deep Learning on Highway Driving", Apr. 17, 2015, 7 pages. Available at: https://arxiv.org/pdf/1504.01716.pdf.
Dipietro, Rob, "A Friendly Introduction to Cross-Entropy Loss," Version 0.1—May 2, 2016, 10 pages. Available at: https://rdipietro.github.io/friendly-intro-to-cross-entropy-loss/.
Davy Neven et al: "Towards End-to-End Lane Detection: an Instance Segmentation Approach", Feb. 15, 2018 (Feb. 15, 2018), pp. 1-7, XP055590532, Retrieved from the Internet: URL:https://arxiv.org/pdf/1802.05591.pdf [retrieved on May 21, 2019].
International Search Report and Written Opinion dated Jul. 24, 2019 in International Patent Application No. PCT/US2019/019656, 15 pages.
Garnett Noa et al: "Real-Time Category-Based and General Obstacle Detection for Autonomous Driving", 2017 IEEE International Conference on Computer Vision Workshops (ICCVW), IEEE, Oct. 22, 2017 (Oct. 22, 2017), pp. 198-205, XP033303458.
International Search Report and Written Opinion dated Aug. 26, 2019 in International Patent Application No. PCT/US2019/022592, 18 pages.
Non-Final Office Action dated Oct. 21, 2020 in U.S. Appl. No. 16/277,895, 13 pages.
Jayaraman, A. et al., "Creating 3D Virtual Driving Environments for Simulation-Aided Development of Autonomous Driving and Active Safety", SAE Technical Paper Series, vol. 1, pp. 1-3 (Mar. 28, 2017) (English Abstract Submitted).
Liu, H. et al., "Neural Person Search Machines", IEEE International Conference on Computer Vision (ICCV), IEEE, pp. 493-501 (2017).
International Preliminary Report on Patentability received for PCT Application No. PCT/US2019/018348, dated Aug. 27, 2020, 16 pages.
International Preliminary Report on Patentability received for PCT Application No. PCT/US2019/019656, dated Sep. 3, 2020, 11 pages.
International Preliminary Report on Patentability received for PCT Application No. PCT/US2019/022592, dated Sep. 24, 2020, 11 pages.

(56) References Cited

OTHER PUBLICATIONS

International Preliminary Report on Patentability received for PCT Application No. PCT/US2019/024400, dated Oct. 8, 2020, 10 pages.
Preinterview First Office Action dated Jan. 26, 2021 in U.S. Appl. No. 16/355,328, 5 pages.
First Action Interview Office Action dated Mar. 1, 2021 in U.S. Appl. No. 16/355,328, 4 pages.

\* cited by examiner

REAL-TIME DETECTION OF LANES AND BOUNDARIES BY AUTONOMOUS VEHICLES

CROSS-REFERENCE TO RELATED APPLICATIONS

This application claims the benefit of U.S. Provisional Application No. 62/636,142, filed on Feb. 27, 2018, which is hereby incorporated by reference in its entirety.

BACKGROUND

For autonomous vehicles to operate safely in all environments, the autonomous vehicles must be capable of effectively performing vehicle maneuvers—such as lane keeping, lane changing, lane splits, turns, stopping and starting at intersections, crosswalks, and the like, and/or other vehicle maneuvers. For example, for an autonomous vehicle to navigate through surface streets (e.g., city streets, side streets, neighborhood streets, etc.) and on highways (e.g., multi-lane roads), the autonomous vehicle is required to navigate an often rapidly moving vehicle among one or more divisions (e.g., lanes, intersections, crosswalks, boundaries, etc.) of a road that are often minimally delineated, and may be difficult to identify in certain conditions even for the most attentive and experienced of drivers. In other words, an autonomous vehicle is required to be a functional equivalent of an attentive human driver, who draws upon a perception and action system that has an incredible ability to identify and react to moving and static obstacles in a complex environment, merely to avoid colliding with other objects or structures along its path.

Conventional approaches to detecting lane and road boundaries include generating and processing images from one or more cameras, and attempting to interpolate the lane and road boundaries from visual indicators identified during the processing (e.g., using computing vision or other machine learning techniques. However, performing lane and road boundary detection in this way has proven to be either too computationally expensive to run effectively in real-time and/or has suffered from inaccuracy as a result of shortcuts implemented to reduce computing requirements. In other words, these conventional systems either forego accuracy to operate in real-time, or forego operation in real-time to produce acceptable accuracy. Additionally, even in conventional systems that achieve a level of accuracy required for safe and effective operation of autonomous vehicles, the accuracy is limited to ideal road and weather conditions. As a result, autonomous vehicles that operate using these conventional approaches may not be able to accurately operate in real-time and/or with accuracy in all road and weather conditions.

SUMMARY

Embodiments of the present disclosure relate to using machine learning models to detect lanes and road boundaries by autonomous vehicles and advanced driver assistance systems in real-time. More specifically, systems and methods are disclosed that provide for accurate detection and identification of lanes and road boundaries in real-time using a deep neural network that is trained—e.g., using low-resolution images, region of interest images, and a variety of ground truth masks—to detect lanes and boundaries in a variety of situations, including less than ideal weather and road conditions.

In contrast to conventional systems, such as those described above, the current system may use one or more machine learning models that are computationally inexpensive and capable of real-time deployment to detect lanes and boundaries. The machine learning model(s) may be trained with a variety of annotations as well as a variety of transformed images such that the machine learning model(s) is capable of detecting lanes and boundaries in an accurate and timely manner, especially at greater distances. The machine learning model(s) may be trained using low-resolution images, region of interest images (e.g., cropped images), transformed images (e.g., spatially augmented, color augmented, etc.), ground truth labels or masks, and/or transformed ground truth labels or masks (e.g., augmented according to the corresponding augmentation of the transformed images to which they relate). The machine learning model(s) may also be trained using both binary and multi-class segmentation masks, further increasing the accuracy of the model. In addition, post-processing may be performed on outputs of the machine learning model(s) to more accurately identify and label types and contours of the lane markings and boundaries. After post-processing, lane curves and labels may be generated that may be used by one or more layers of an autonomous driving software stack—such as a perception layer, a world model management layer, a planning layer, a control layer, and/or an obstacle avoidance layer.

As a result of executing lane and road boundary detection according to the processes of the present disclosure, autonomous vehicles may be able to detect lanes and road boundaries of a driving surface to effectively and safely navigate within a current lane, through lane changes, through lane merges and lane splits, through intersections, and/or through other features of the driving surface in a variety of road and weather conditions. In addition, because of the architecture of the machine learning model(s), the training methods for the machine learning model(s), and the post-processing methods for converting outputs of the machine learning model(s) to lane curves and labels, lane and boundary detection performed according to the present disclosure may be less computationally expensive—requiring less processing power, energy consumption, and bandwidth—than in conventional approaches.

BRIEF DESCRIPTION OF THE DRAWINGS

The present systems and methods for real-time detection of lanes and road boundaries by autonomous vehicles is described in detail below with reference to the attached drawing figures, wherein.

DETAILED DESCRIPTION

Figure 1A:
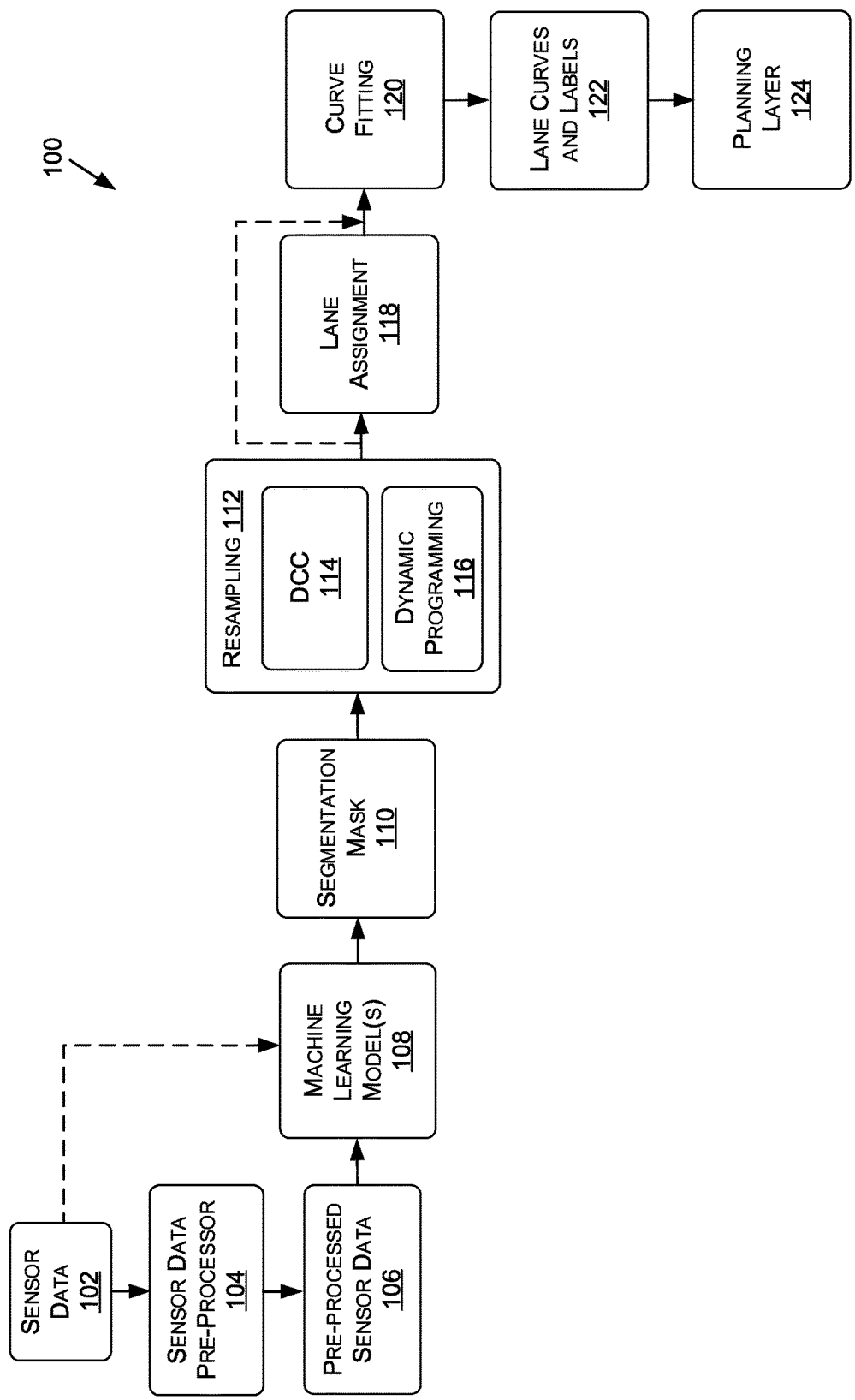
FIG. 1A is a data flow diagram illustrating an example process for detecting lanes and road boundaries, in accordance with some embodiments of the present disclosure.

Systems and methods are disclosed related to using one or more machine learning models to detect, in real-time, lanes and road boundaries by autonomous vehicles and/or advanced driver assistance systems (ADAS). The present disclosure may be described with respect to an example autonomous vehicle 800 (alternatively referred to herein as "vehicle 800" or "autonomous vehicle 800", an example of which is described herein with respect to FIGS. 8A-8D. However, this is not intended to be limiting. For example, the systems and methods described herein may be used in augmented reality, virtual reality, robotics, and/or other technology areas, such as for localization, calibration, and/or other processes. In addition, although the detections described herein relate primarily to lanes, road boundaries, lane splits, lane merges, intersections, crosswalks, and/or the like, the present disclosure is not intended to be limited to only these detections. For examples, the processes described herein may be used for detecting other objects or features, such as signs, poles, trees, barriers, and/or other objects or features. In addition, although the description in the present disclosure separates lane detections from lane splits and lane merges, this is not intended to be limiting. For example, features and functionality described herein with respect to detecting lanes and road boundaries may also be applicable to detecting lane splits and/or lane merges. In the alternative, features and functionality described herein with respect to detecting lane splits and/or lane merges may also be applicable to detecting lanes and/or road boundaries.

Lane and Road Boundary Detection System

As described above, conventional systems rely on real-time images processed using various computer vision or machine learning techniques (e.g., from visual indicators identified via image processing) to detect lanes and/or road boundaries. These techniques are either too computationally expensive to accurately perform tasks in real-time and/or suffer from inaccuracy as a result of shortcuts implemented to reduce computing requirements. As a result, conventional systems fail to provide the necessary level of accuracy in detecting lanes and/or road boundaries in real-time by either providing accurate information too late or inaccurate information unsuitable by an autonomous vehicle to safely navigate while driving.

In contrast, the present systems provide for an autonomous vehicle that may detect lanes and/or road boundaries with increased processing capability by using a comparatively smaller footprint (e.g., less layers than conventional approaches) deep neural network (DNN). The DNN may be trained using a variety of different images and ground truth masks—such as low-resolution full field of view images, higher-resolution region of interest (ROI) images, or a combination thereof—in order to increase the accuracy of the DNN in detecting lanes and road boundaries, especially at greater distances. Additionally, because of the architecture of the DNN, the training process for the DNN, and the post-processing of the DNN output, the current systems, when deployed in an autonomous vehicle, may be able to accurately detect lanes and road boundaries—including those that are occluded—in real-time and in less than ideal weather or road conditions.

For example, real-time visual sensor data (e.g., data representative of images and/or videos, LIDAR data, RADAR data, etc.) may be received from sensors (e.g., one or more cameras, one or more LIDAR sensors, one or more RADAR sensors, etc.) located on an autonomous vehicle. The sensor data may be applied to a machine learning model(s) (e.g., the DNN) that is trained to identify areas of interest pertaining to road markings, road boundaries, intersections, and/or the like (e.g., raised pavement markers, rumble strips, colored lane dividers, sidewalks, cross-walks, turn-offs, etc.) from the sensor data.

More specifically, the machine learning model(s) may be a DNN designed to infer lane and boundary markers and to generate one or more segmentation masks (e.g., binary and/or multi-class) that may identify where in the representations (e.g., image(s)) of the sensor data potential lanes and road boundaries may be located. In some examples, the segmentation mask(s) may include points denoted by pixels in the image where lanes and or boundaries may have been determined to be located by the DNN. In some embodiments, the segmentation mask(s) generated may be a binary mask with a first representation for background elements (e.g., elements other than lanes and boundaries) and a second representation for foreground elements (e.g., lanes and boundaries). In other examples, in addition to, or alternative from, the binary mask, the DNN may be trained to generate a multi-class segmentation mask, with different classes relating to different lane markings and/or boundaries. In such examples, the classes may include a first class for background elements, a second class for road boundaries, a third class for solid lane markings, a fourth class for dashed lane markings, a fifth class for intersections, a sixth class for crosswalks, a seventh class for lane splits, and/or other classes.

The DNN itself may include any number of different layers, although some examples include fourteen or less layers in order to minimize data storage requirements and increase processing speeds for the DNN in comparison to conventional approaches. The DNN may include one or more convolutional layers, and the convolutional layers may continuously down sample the spatial resolution of the input image (e.g., until the output layers, or one or more deconvolutional layers, are reached. The convolutional layers may be trained to generate a hierarchical representation of input images with each layer generating a higher-level extraction than its preceding layer. As such, the input resolution at each layer may be decreased, making the DNN capable of processing sensor data (e.g., image data, LIDAR data, RADAR data, etc.) faster than conventional systems. The DNN may include one or more deconvolutional layers, which may be the output layer(s) in some examples. The deconvolutional layer(s) may up-sample the spatial resolution to generate an output image of comparatively higher spatial resolution than the convolutional layers preceding the deconvolutional layer. The output of the DNN (e.g., the segmentation mask) may indicate a likelihood of a spatial grid cell (e.g., a pixel) belonging to a certain class of lanes or boundaries.

The DNN may be trained with labeled images using multiple iterations until the value of one or more loss functions of the network are below a threshold loss value. The DNN may perform forward pass computations on the training images to generate feature extractions of each transformation. In some examples, the DNN may extract features of interest from the images and predict a probability of the features corresponding to a particular boundary class or lane class in the images on a pixel-by-pixel basis. The loss function(s) may be used to measure error in the predictions of the DNN using one or more ground truth masks. In one example, a binary cross entropy function may be used as the loss function.

Backward pass computations may be performed to recursively compute gradients of the loss function with respect to training parameters. In some examples, weight and biases of the DNN may be used to compute these gradients. For example, region based weighted loss may be added to the loss function, where the loss function may increasingly penalize loss at farther distances from the bottom of the image (e.g., representing locations in a physical environment further from the autonomous vehicle). Advantageously, this may improve detection of lanes and boundaries at farther distances as compared to conventional systems because detecting at further distances may be more finely tuned and thus better approximated by the DNN. In some examples, an optimizer may be used to make adjustments to the training parameters (e.g., weights, biases, etc.). In one example, an Adam optimizer may be used, while in others, stochastic gradient descent, or stochastic gradient descent with a momentum term, may be used to make these adjustments. The training process (e.g., forward pass computations—backward pass computations—parameter updates) may be reiterated until the trained parameters converge to optimum, desired, or acceptable values.

In some non-limiting examples, once the segmentation mask is output by the DNN, any number of post-processing steps may be performed in order to ultimately generate lane marking types and curves. In some examples, connected component (CC) labeling may be used. In other examples, directional connected components (DCC) labeling may be used to group pixels (or points) from the segmentation mask based on the pixel values as well as the lane type connectivity in a direction from bottom of the image to top of the image. By using DCC, as compared to CC labeling, the perspective view (e.g., from the sensor(s) of the vehicle) of the lane markings and road boundaries of the driving surface may be taken advantage of. DCC may also leverage lane appearance type (e.g., based on classes of the multi-class segmentation mask) when determining which pixels or points may be connected.

In another non-limiting example, dynamic programming may be used to determine a set of significant peak points represented by 2D locations and to determine associated confidence values. For each pair of the significant peak points, connectivity may be evaluated, and a set of peaks and edges with corresponding connectivity scores may be generated (e.g., based on confidence values). A shortest path algorithm, a longest path algorithm, and/or all-pairs-shortest path (APSP) algorithms may be used to identify candidate lane edges. In some examples, an additional curvature smoothness term may be used when applying an APSP function to create a bias toward smooth curves over zig-zag candidate lane edges. A clustering algorithm may then be used to produce a set of final lane edges by merging sub-paths and similar paths (e.g., identified to correspond to candidate lane edges) into one group.

The final lane edges may then be assigned lane types, which may be determined relative to a position of the vehicle. Potential lane types may include, without limitation, left boundary of the vehicle lane (e.g., ego-lane), right boundary of the vehicle lane, left outer boundary of left-adjacent lane to the vehicle lane, right outer boundary of right-adjacent lane to the vehicle lane, etc.

In some examples, curve fitting may also be executed in order to determine final shapes that most accurately reflect a natural curve of the lane markings and/or road boundaries. Curve fitting may be performed using polyline fitting, polynomial fitting, clothoid fitting, and/or other types of curve-fitting algorithms. In some examples, lane curves may be determined by resampling segmentation points in the area of interest included in the segmentation mask.

Ultimately, data representing the lane markings, lane boundaries, and associated types may then be compiled and sent to a perception layer, a world model management layer, a planning layer, a control layer, and/or another layer of an autonomous driving software stack to aid the autonomous vehicle in navigating the driving surface safely and effectively.

Now referring to FIG. 1A, FIG. 1A is a data flow diagram illustrating an example process 100 for detecting lanes and road boundaries, in accordance with some embodiments of the present disclosure. While the detection types described with respect to FIG. 1A are lane and road boundary detection, this is not intended to be limiting, and is used for example purposes only.

Figure 8A:
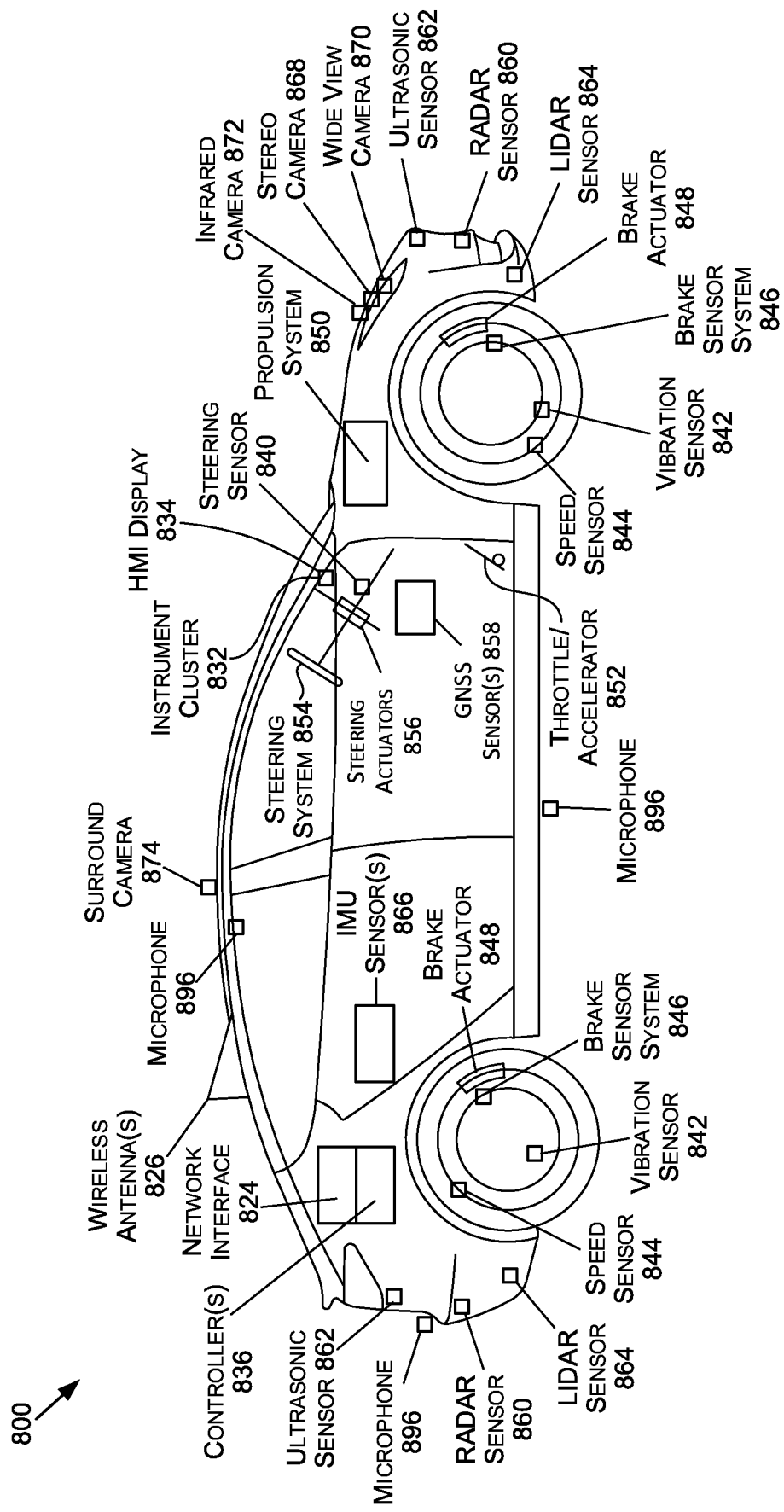
FIG. 8A is an illustration of an example autonomous vehicle, in accordance with some embodiments of the present disclosure.
Figure 8B:
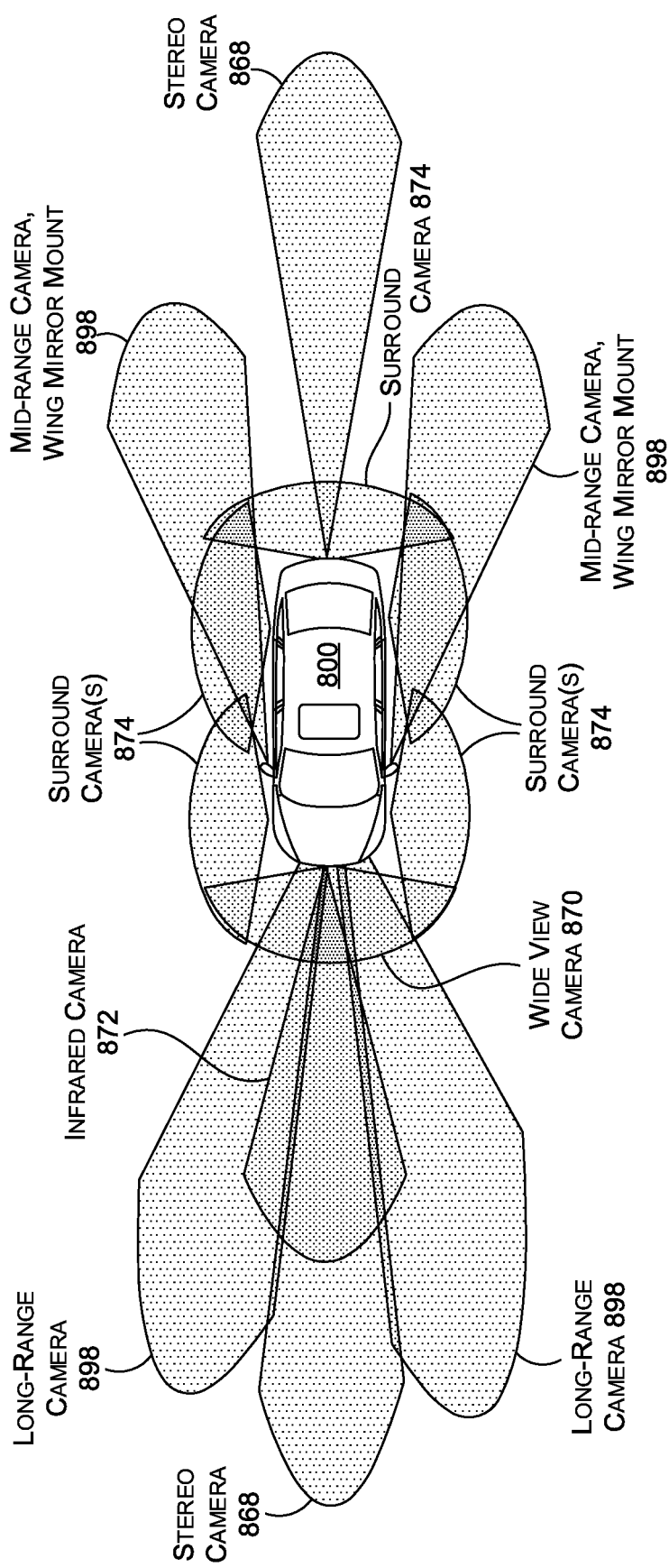
FIG. 8B is an example of camera locations and fields of view for the example autonomous vehicle of FIG. 8A, in accordance with some embodiments of the present disclosure.
Figure 8C:
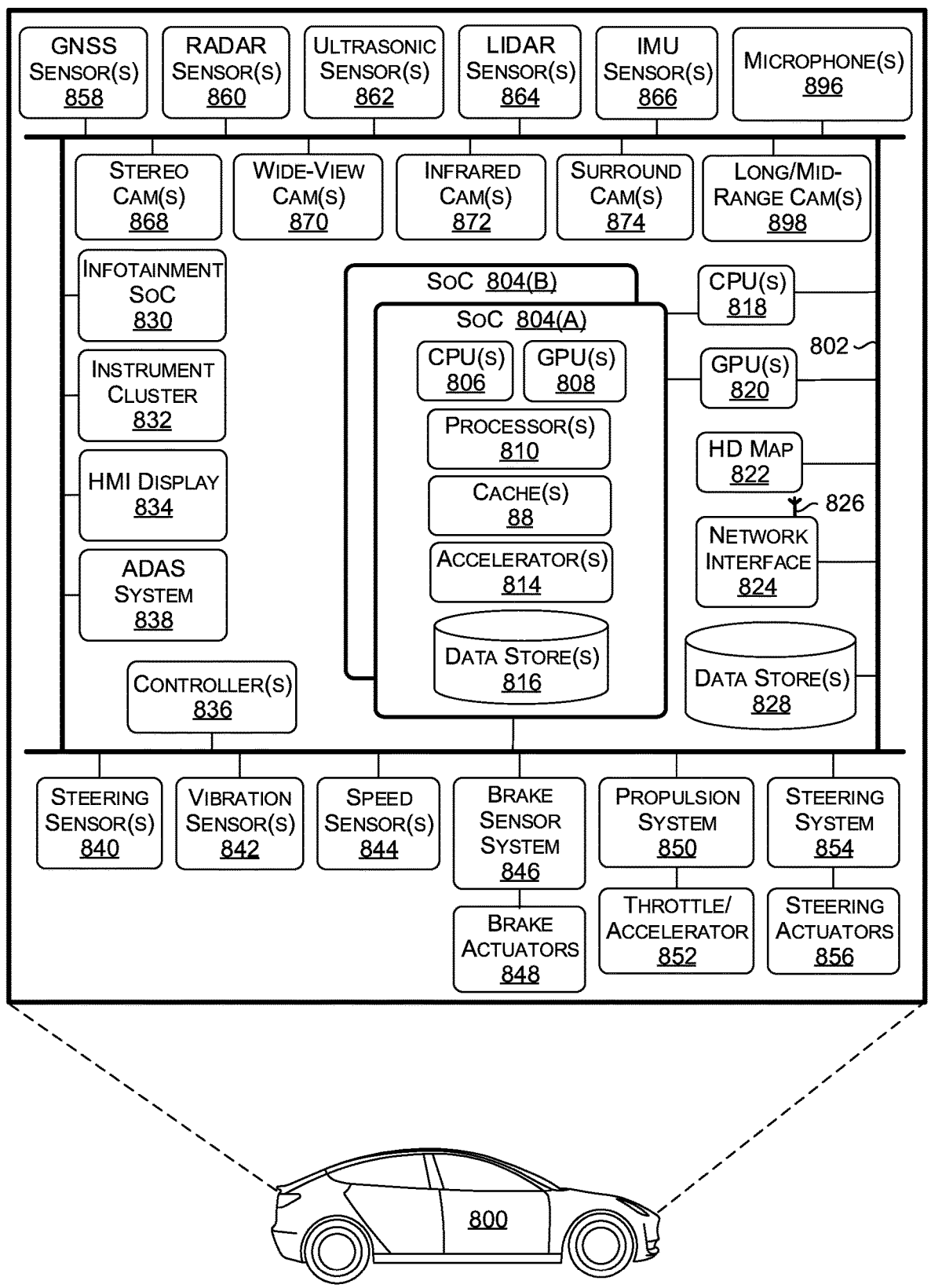
FIG. 8C is a block diagram of an example system architecture for the example autonomous vehicle of FIG. 8A, in accordance with some embodiments of the present disclosure.

The process 100 for lane and road boundary detection may include generating and/or receiving sensor data 102 from one or more sensors of the autonomous vehicle 800. The sensor data 102 may include sensor data from any of the sensors of the vehicle 800 (and/or other vehicles or objects, such as robotic devices, VR systems, AR systems, etc., in some examples). With reference to FIGS. 8A-8C, the sensor data 102 may include the data generated by, for example and without limitation, global navigation satellite systems (GNSS) sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

In some examples, the sensor data 102 may include the sensor data generated by one or more forward-facing cameras (e.g., a center or near-center mounted camera(s)), such as a wide-view camera 870, a surround camera 874, a stereo camera 868, and/or a long-range or mid-range camera 898. This sensor data may be useful for computer vision and/or perception when navigating—e.g., within a lane, through a lane change, through a turn, through an intersection, etc.—because a forward-facing camera may include a field of view (e.g., the field of view of the forward-facing stereo camera 868 and/or the wide-view camera 870 of FIG. 8B) that includes both a current lane of travel of the vehicle 800, adjacent lane(s) of travel of the vehicle 800, and/or boundaries of the driving surface. In some examples, more than one camera or other sensor (e.g., LIDAR sensor, RADAR sensor, etc.) may be used to incorporate multiple fields of view (e.g., the fields of view of the long-range cameras 898, the forward-facing stereo camera 868, and/or the forward facing wide-view camera 870 of FIG. 8B).

In any example, the sensor data 102 may include image data representing an image(s), image data representing a video (e.g., snapshots of video), and/or sensor data representing fields of view of sensors (e.g., LIDAR sensor(s) 864, RADAR sensor(s) 860, etc.). In some examples, the sensor data 102 may be input into the machine learning model(s) 108 and used by the machine learning model(s) 108 to compute segmentation mask(s) 110. In some other examples, the sensor data 102 may be provided as input to the sensor data pre-processor 104 to generate pre-processed sensor data 106. The pre-processed sensor data 106 may then be input into the machine learning model(s) 108 as input data.

Many types of images or formats may be used as inputs, for example, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. It is noted that different formats and/or resolutions could be used training the machine learning model(s) 108 than for inferencing (e.g., during deployment of the machine learning model(s) 108 in the autonomous vehicle 800).

The sensor data pre-processor 104 may use sensor data representative of one or more images (or other data representations) and load the sensor data into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor 104. This ordering may be chosen to maximize training and/or inference performance of the machine learning model(s) 108.

Figure 1B:
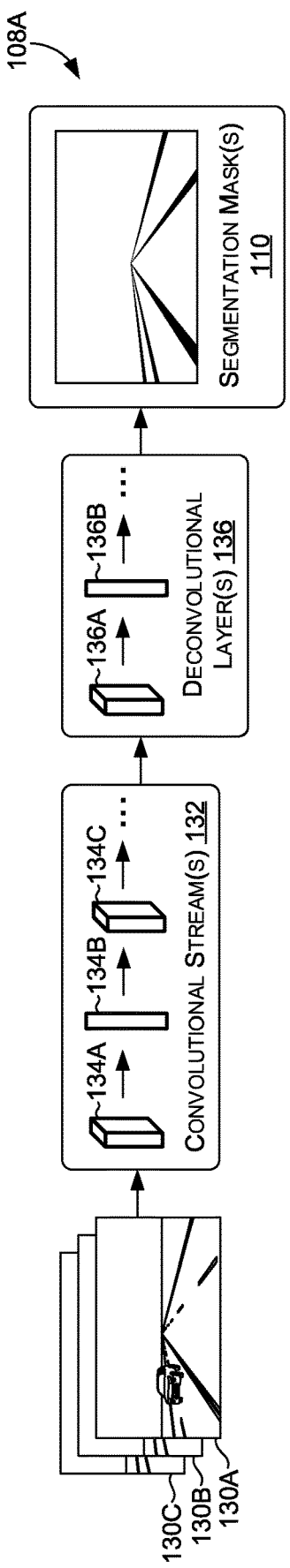
FIG. 1B is an illustration of an example machine learning model, in accordance with some embodiments of the present disclosure.

A pre-processing image pipeline may be employed by the sensor data pre-processor 104 to process a raw image(s) acquired by a sensor(s) and included in the sensor data 102 to produce pre-processed sensor data 106 which may represent an input image(s) to the input layer(s) (e.g., convolutional streams(s) 132 of FIG. 1B) of the machine learning model(s) 108. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the sensor data pre-processor 104, it may include bilateral denoising in the Bayer domain. Where demosaicing is employed by the sensor data pre-processor 104, it may include bilinear interpolation. Where histogram computing is employed by the sensor data pre-processor 104, it may involve computing a histogram for the C channel, and may be merged with the decompanding or noise reduction in some examples. Where adaptive global tone mapping is employed by the sensor data pre-processor 104, it may include performing an adaptive gamma-log transform. This may include calculating a histogram, getting a mid-tone level, and/or estimating a maximum luminance with the mid-tone level.

The machine learning model(s) 108 may use as input one or more images (or other data representations) represented by the sensor data 102 to generate one or more segmentation masks 110 as output. In a non-limiting example, the machine learning model(s) 108 may take as input an image(s) represented by the pre-processed sensor data 106 (alternatively referred to herein as "sensor data 106") to generate a segmentation mask(s) 110. Although examples are described herein with respect to using neural networks, and specifically convolutional neural networks, as the machine learning model(s) 108 (e.g., with respect to FIGS. 1B, 1C, 3A, 3C, and 7C), this is not intended to be limiting. For example, and without limitation, the machine learning model(s) 108 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The segmentation mask(s) 110 output by the machine learning model(s) 108 may represent portions of the input image(s) determined to correspond to lane markings or road boundaries of a driving surface of the vehicle 800. The machine learning model(s) 108 may include one or more neural networks trained to generate the segmentation mask(s) 110 as output that identifies where in the image(s) potential lanes and boundaries may be located. In a non-limiting example, the segmentation mask(s) 110 may further represent confidence scores corresponding to a probability of each of the portions of the mask corresponding to potential lanes and/or road boundaries. In addition, in some examples, the segmentation mask(s) 110 may further represent confidence scores corresponding to probabilities of each of the portions of the mask corresponding to a certain class of lane marking or road boundary (e.g., a lane marking type and/or a road boundary type).

In some examples, the segmentation mask(s) 110 may include points (e.g., pixels) in the image where lanes and or road boundaries are determined to be located by the machine learning model(s) 108. In some examples, the segmentation mask(s) 110 generated may include one or more binary masks (e.g., binary mask head 334 of FIG. 3C) with a first representation for background elements (e.g., elements other than lanes and road boundaries) and a second representation for foreground elements (e.g., lanes and road boundaries). The binary mask may be output by the machine learning model(s) 108 as pixel values of 0 or 1 (for black or white), may include other pixel values, or may include a range of values that are interpreted as 0 or 1 (e.g., 0 to 0.49 is interpreted as 0, and 0.5 to 1 is interpreted as 1). A resulting visualization (e.g., the illustration of the segmentation mask 110 in FIG. 1A-1B) may be a black and white version of the image. Although the lines, boundaries, and/or other features are included as black in the illustration, and the background elements are white, this is not intended to be limiting. For example, the background elements may be black and the foreground may be white, or other colors may be used.

In other examples, the machine learning model(s) 108 may be trained to generate one or more multi-class segmentation masks (e.g., multi-class mask head 332 of FIG. 3C) as the segmentation mask(s) 110, with different classes relating to different lane markings and/or boundaries. In such examples, the classes may include a first class for background elements, a second class for road boundaries, a third class for solid lane markings, a fourth class for dashed lane markings, a fifth class for intersections, a sixth class for crosswalks, a seventh class for lane splits, and/or additional or alternative classes. A resulting visualization (e.g., the illustration of the multi-class mask head 332 of FIG. 3C) may include a first pixel value for background elements, a second pixel value for road boundaries (e.g., a pixel value corresponding to red), a third pixel value for solid lane markings (e.g., a pixel value corresponding to green), and so on.

The segmentation mask(s) 110 output by the machine learning model(s) 108 may undergo post-processing. For example, the segmentation mask(s) 110 may undergo resampling 112. The resampling 112 may include extracting points (e.g., pixels) from the segmentation mask(s) 110 where the points may correspond to lanes (e.g., lane markings) and/or road boundaries as determined by the machine learning model(s) 108. The resampling 112 may include grouping pixels in the segmentation mask(s) 110 into lane components for each area of interest (e.g., each detected lane marking or road boundary).

In some non-limiting examples, connected components (CC) labeling may be used to group the points. In other non-limiting examples, directional connected components (DCC) 114 labeling may be used to group points from the segmentation mask(s) 110 based on the pixel values and/or lane type connectivity (e.g., white dashed line, white solid line, yellow dashed line, yellow solid line, etc.). As compared to CC labeling, DCC 114 may scan the image(s) from bottom to top, thereby taking advantage of the perspective view (e.g., from the sensor(s) of the vehicle 800) of the lane markings and/or road boundaries of the driving surface. In such examples, DCC 114 may compare or examine a bottom neighbor or bottom adjacent point of a given point to increment or determine whether the given point is from the same lane marking type and thus should be connected. In some examples, DCC 114 may leverage lane appearance type (e.g., based on classes of the multi-class segmentation mask) when determining which points (e.g., pixels) should be connected. For example, a given point may not be grouped with its corresponding bottom neighbor point if the bottom neighbor point belongs to a different lane appearance type.

In another non-limiting example, dynamic programming 116 may be used as part of the resampling 112 of the process 100. Dynamic programming 116 may include determining a set of significant peak points (e.g., pixels) represented by 2D locations and associated confidence values for each area of interest (e.g., each detected lane and/or road boundary). One or more methods, such as but not limited to those described herein, may be used to determine the set of significant peak points. In a non-limiting example, the set of significant points may be determined by performing non-maxima suppression after Gaussian smoothing of the points (e.g., pixels) in the area(s) of interest of the segmentation mask(s) 110. For all pairs of the peak points, connectivity may be evaluated, and a set of peak points and edges with corresponding connectivity scores may be generated (e.g., based on confidence values). In some examples, the connectivity may be computed as a sum of confidence values of all points in the area of interest between the pair of peak points. In another example, a fixed number of equally sampled points (e.g., pixels) between the pair may be used to generate the connectivity scores. In yet a further example, confidence values for all peak points may be fed into a robustifier function, such as an exponential or Cauchy function. The robustifier function may be used to generate connectivity scores for each pair of peak points. As compared to conventional connected components (CC) labeling, these functions detect connection sensitivity at even a weak connection between peak points). In some examples, class labels, such as those in the multi-class segmentation mask(s) may be used to further refine connectivity between pixels.

Dynamic programming 116 may further include using a shortest path algorithm, a longest path algorithm, and/or all-pairs-shortest path (APSP) algorithm to identify candidate lane edges. In some examples, connectivity of the peak points (e.g., pixels) may be formulated in terms of cost. In such examples, lane edges may be identified using a shortest path algorithm. In another example, connectivity of the peak points may be formulated in terms of likelihood of connection. In such an example, the lane edges may be identified using a longest path algorithm. Although examples are described herein with respect to using a shortest path algorithm, a longest path algorithm, and/or an APSP algorithm to determine lane edges as part of dynamic programming 116, this is not intended to be limiting. For example, and without limitation, the dynamic programming 116 described herein may include any type and/or combination of algorithms to identify candidate lane edges.

In some non-limiting examples, the dynamic programming 116 may use an additional curvature smoothness term when identifying lane edges to create a bias toward smooth curves over zig-zag candidate lane edges. In one example, the preference may be adjusted using a control parameter in an optimization algorithm.

In any example, a clustering algorithm may be used to produce a set of final lane edges by merging sub-paths and similar paths (e.g., identified to correspond to candidate lane edges) into one group. In some examples, topological or spatial clustering algorithms may be applied sequentially and/or in tandem. Topological clustering algorithms may be used to merge two paths if one path is a sub-part of the other. Additionally or alternatively, if two paths share common pairs of peak points, the path with a lower likelihood or higher cost may be merged with the one with the higher likelihood or lower cost. Spatial clustering algorithms may merge paths based on similarities between geometries of paths. For example, a spatial clustering algorithm may merge a path with lower likelihood or higher cost to a path with higher likelihood or lower cost (e.g., when the two paths are determined to be geometrically similar to one another).

The final lane edges derived by resampling 112 may then undergo lane assignment 118 to be assigned lane types and/or road boundary types. In some examples, the lane types and/or road boundary types may be determined relative to a position of the vehicle 800. For example, lane types (e.g., lane-marking types) may include a left boundary of the vehicle lane (e.g., the ego-lane), right boundary of the vehicle lane, left outer boundary of left-adjacent lane to the vehicle lane, right outer boundary of right-adjacent lane to the vehicle lane, and/or other types.

In some examples, it may be assumed that the principal axis of the sensor that generated the sensor data 102 is approximately aligned with the roll axis of the vehicle 800 (e.g., a longitudinal axis). In such examples, the sensor may actually be aligned with the roll axis, in others, the sensor may be positioned within a threshold distance from the roll axis that the sensor data 102 is useable, and/or the sensor data 102 may be transformed (e.g., shifted) based on calibration data of the sensor (e.g., based on a distance from the roll axis). The lane marking types and/or road boundary types may then be determined based on this assumption. For example, a lane marking to the right of a vertical centerline (e.g., extending from bottom to top) of an image (e.g., representing the sensor data 102) may be determined to be the right boundary of the vehicle lane, the next lane marking to the right may be the right outer boundary of the right-adjacent lane of the vehicle 800, and so on. Similarly, for the left of the vertical centerline of the image, a lane marking to the left of the vertical centerline may be determined to be the left boundary of the vehicle lane, the next lane marking to the left may be the left outer boundary of the left-adjacent lane of the vehicle 800, and so on.

More specifically, for each lane edge, the bottom of the edge may be extended to meet the bottom of the corresponding image. As such, for each lane edge, the intersection of the extended lane edge with the bottom of the image may be determined in terms of column difference (or distance) from the intersection with the bottom of the image to the vertical centerline of the image (e.g., the principal axis). The lane edge associated with the minimum positive column difference (e.g., the minimum column difference to the right of the principal axis) may be identified as right boundary of the vehicle lane. The lane edge with the second smallest positive column difference (e.g., the second smallest column difference to the right of the principal axis) may be identified as the right boundary of the right-adjacent lane to the vehicle lane. Similarly, the lane edge associated with the minimum negative column difference (e.g., the minimum column difference to the left of the principal axis) may be identified as left boundary of the vehicle lane, and the lane edge with the second smallest negative column difference (e.g., the second smallest column difference to the left of the principal axis) may be identified as the left boundary of the left-adjacent lane to the vehicle lane. In some examples, this labeling may extend to any number of lanes and/or road boundaries. In other examples, only a certain number of lanes and/or road boundaries may be labeled, and any remaining lanes and/or road boundaries may be labeled as undefined. In such examples, one or more of the remaining lanes and/or road boundaries that are identified may be removed and/or not included in any further processing by the vehicle 800.

Curve fitting 120 may also be implemented in order to determine final shapes of the potential lanes and/or boundaries identified that most accurately reflect a natural curve of the lane markings and/or boundaries. Curve fitting 120 may be performed using polyline fitting, polynomial fitting, clothoid fitting, and/or other types of curve-fitting algorithms. In examples where clothoid fitting is used, curve fitting 120 may include tuning the number of clothoids in the clothoid fitting algorithm to fit the curve of the driving surface of vehicle 800. In some examples, the curve fitting 120 may be performed using the lane edges identified from resampling 112 and/or lane assignment 118. In other examples, curve fitting 120 may be performed by resampling points (e.g., segmentation points) in the area(s) of interest included in the segmentation mask(s) 110 (as indicated by the dashed line in FIG. 1A).

The output of the resampling 112, the lane assignment 118, and/or the curve fitting 120 may then be used (e.g., after compiling) to generate data representative of lane labels (or assignments) and lane curves 122, respectively. Ultimately, data representing the lane markings, lane boundaries, and/or associated label types may then be compiled and sent to one or more layers of the autonomous driving software stack, such as a world model management layer, a perception layer, a planning layer, a control layer and/or another layer. The autonomous driving software stack may thus use the data to aid in navigating the vehicle 800 through the driving surface within the physical environment.

Now referring to FIG. 1B, FIG. 1B is an illustration of an example machine learning model(s) 108A, in accordance with some embodiments of the present disclosure. The machine learning model(s) 108A of FIG. 1B may be one example of a machine learning model(s) 108 that may be used in the process 100. However, the machine learning model(s) 108A of FIG. 1B is not intended to be limiting, and the machine learning model(s) 108 may include additional and/or different machine learning models than the machine learning model(s) 108A of FIG. 1B. The machine learning model(s) 108A may include or be referred to as a convolutional neural network and thus may alternatively be referred to herein as convolutional neural network 108A or convolutional network 108A.

The convolutional network 108 may use the sensor data 102 and/or the pre-processed sensor data 106 as an input. For example, the convolutional network 108A may use the sensor data 130—as represented by the sensor data 130A-130C—as an input. The sensor data 130 may include images representing image data generated by one or more cameras (e.g., one or more of the cameras described herein with respect to FIGS. 8A-8C). For example, the sensor data 130A-130C may include image data representative of a field of view of the camera(s). More specifically, the sensor data 130A-130C may include individual images generated by the camera(s), where image data representative of one or more of the individual images may be input into the convolutional network 108 at each iteration of the convolutional network 108.

The sensor data 102 and/or pre-processed sensor data 106 may be input into a convolutional layer(s) 132 of the convolutional network 108 (e.g., convolutional layer 134A). The convolutional stream 132 may include any number of layers 134, such as the layers 134A-134C. One or more of the layers 134 may include an input layer. The input layer may hold values associated with the sensor data 102 and/or pre-processed sensor data 106. For example, when the sensor data 102 is an image(s), the input layer may hold values representative of the raw pixel values of the image(s) as a volume (e.g., a width, W, a height, H, and color channels, C (e.g., RGB), such as 32×32×3), and/or a batch size, B.

One or more layers 134 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 134 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 134 may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the convolutional network 108A may not include any pooling layers. In such examples, strided convolution layers may be used in place of pooling layers.

One or more of the layers 134 may include a fully connected layer. Each neuron in the fully connected layer(s) may be connected to each of the neurons in the previous volume. The fully connected layer may compute class scores, and the resulting volume may be 1×1×number of classes. In some examples, the convolutional stream(s) 132 may include a fully connected layer, while in other examples, the fully connected layer of the convolutional network 108 may be the fully connected layer separate from the convolutional streams(s) 132.

Although input layers, convolutional layers, pooling layers, ReLU layers, and fully connected layers are discussed herein with respect to the convolutional layer(s) 134, this is not intended to be limiting. For example, additional or alternative layers 134 may be used in the convolutional stream(s) 132, such as normalization layers, SoftMax layers, and/or other layer types.

The output of the convolutional stream 132 and/or the convolutional layer(s) 134 may be an input to deconvolutional layer(s) 136. Although referred to as deconvolutional layer(s) 136, this may be misleading and is not intended to be limiting. For example, the deconvolutional layer(s) 136 may alternatively be referred to as transposed convolutional layers or fractionally strided convolutional layers. The deconvolutional layer(s) 136 may be used to perform up-sampling on the output of a prior layer (e.g., a layer 134 of the convolutional stream(s) 132 and/or an output of another deconvolutional layer). For example, the deconvolutional layer(s) 136 may be used to up-sample to a spatial resolution that is equal to the spatial resolution of the input images (e.g., the images 130) to the convolutional network 108A.

Different orders and numbers of the layers 134 and/or 136 of the convolutional network 108A may be used depending on the embodiment. For example, for a first vehicle, there may be a first order and number of layers 134 and/or 136, whereas there may be a different order and number of layers 134 and/or 136 for a second vehicle; for a first camera, there may be a different order and number of layers 134 and/or 136 than the order and number of layers for a second camera. In other words, the order and number of layers 134 and/or 136 of the convolutional network 108A, the convolutional stream 132, and/or the deconvolutional layer(s) 136 is not limited to any one architecture.

In addition, some of the layers 134 may include parameters (e.g., weights and/or biases), such as the layers of the convolutional stream 132 and/or the deconvolutional layer(s) 136, while others may not, such as the ReLU layers and pooling layers, for example. In some examples, the parameters may be learned by the convolutional stream 132 and/or the machine learning model(s) 108A during training. Further, some of the layers 134 and/or 136 may include additional hyper-parameters (e.g., learning rate, stride, epochs, kernel size, number of filters, type of pooling for pooling layers, etc.), such as the convolutional layers 134, the deconvolutional layer(s) 136, and the pooling layers (as part of the convolutional stream(s) 132), while other layers 142 may not, such as the ReLU layers. Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

Figure 1C:
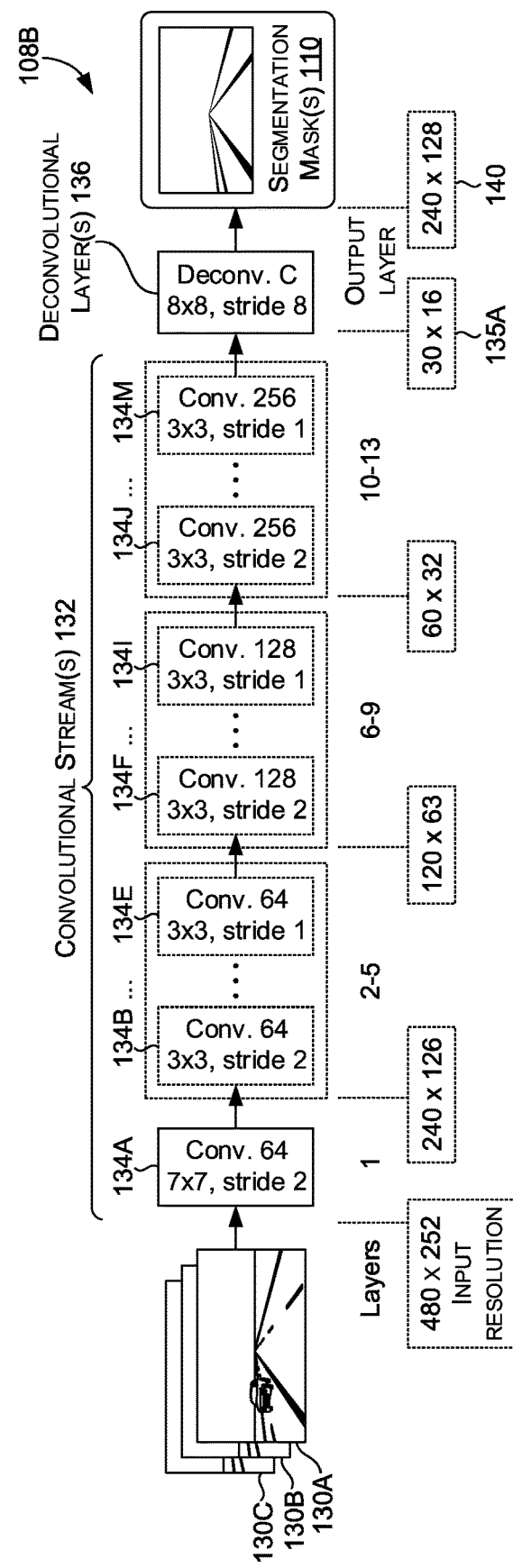
FIG. 1C is an illustration of another example machine learning model, in accordance with some embodiments of the present disclosure.

Now referring to FIG. 1C, FIG. 1C is an illustration of another example machine learning model(s) 108B in accordance with some embodiments of the present disclosure. In some examples, the convolutional network 108A may include any number of different layers, although some examples include fourteen or less layers in order to minimize data storage requirements and to increase processing speeds for the convolutional network 108B. The convolutional layers 134 may continuously down sample the spatial resolution of the input image until the output layers are reached (e.g., down-sampling from a 480×252 input spatial resolution at layer 134A to 240×126 as output of layer 134A, down-sampling from 240×126 input spatial resolution at layer 134E to 120×63 as output of layer 134E, etc.). The convolutional stream(s) 132 may be trained to generate a hierarchical representation of the input image(s) received from the sensor data 102 and/or pre-processed sensor data 106 (e.g., the images 130) with each layer generating a higher-level extraction than its preceding layer. In other words, as can be seen in FIG. 1C, the input resolution across the convolutional layers 134A-134M (and/or any additional or alternative layers) may be decreased, allowing the convolutional network 108A to be capable of processing images faster than conventional systems.

The output layer(s) 136, similar to in FIG. 1B, may be a deconvolution layer(s) that up samples the spatial resolution to generate an output image of comparatively higher spatial resolution than the convolutional layers preceding the deconvolution layer. The output of the convolutional network 108B (e.g., the segmentation mask(s) 110, alternatively referred to as coverage map(s)) may indicate a likelihood of a spatial grid cell belonging to a certain class of lanes or boundaries.

In some examples, the machine learning model(s) 108 (e.g., a neural network(s)) may be trained with labeled images using multiple iterations until the value of a loss function(s) of the machine learning model(s) 108 is below a threshold loss value. For example, the machine learning model(s) 108 may perform forward pass computations on the representations (e.g., image(s)) of the sensor data 102 and/or pre-processed sensor data 106 to generate feature extractions. In some examples, the machine learning model(s) 108 may extract features of interest from the image(s) and predict probability of boundary classes and/or lane classes in the images on a pixel-by-pixel basis. The loss function(s) may be used to measure error in the predictions of the machine learning model(s) 108 using ground truth masks, as described in more detail herein with respect to at least FIGS. 3A, 4A-4B, 5A-5B, and 6A-6E.

In some examples, a binary cross entropy function may be used as a loss function. Backward pass computations may be performed to recursively compute gradients of the loss function with respect to training parameters. In some examples, weights and biases of the machine learning model(s) 108 may be used to compute these gradients. For example, region based weighted loss may be added to the loss function, where the loss function may increasingly penalize loss at distances further from a bottom of the image(s) (e.g., distances further from the vehicle 800). By using region based weighted loss, detections of lanes and/or boundaries at further distances may be improved as compared to conventional systems. For example, the region based weighted loss function may result in back-propagation of more error at further distances during training, thereby reducing the error in predictions by the machine learning model(s) 108 at further distances during deployment of the machine learning model(s) 108.

In some examples, an optimizer may be used to make adjustments to the training parameters (e.g., weights, biases, etc.). In one example, an Adam optimizer may be used, while in other examples, stochastic gradient descent, or stochastic gradient descent with a momentum term, may be used. The training process may be reiterated until the trained parameters converge to optimum, desired, and/or acceptable values.

Figure 2:
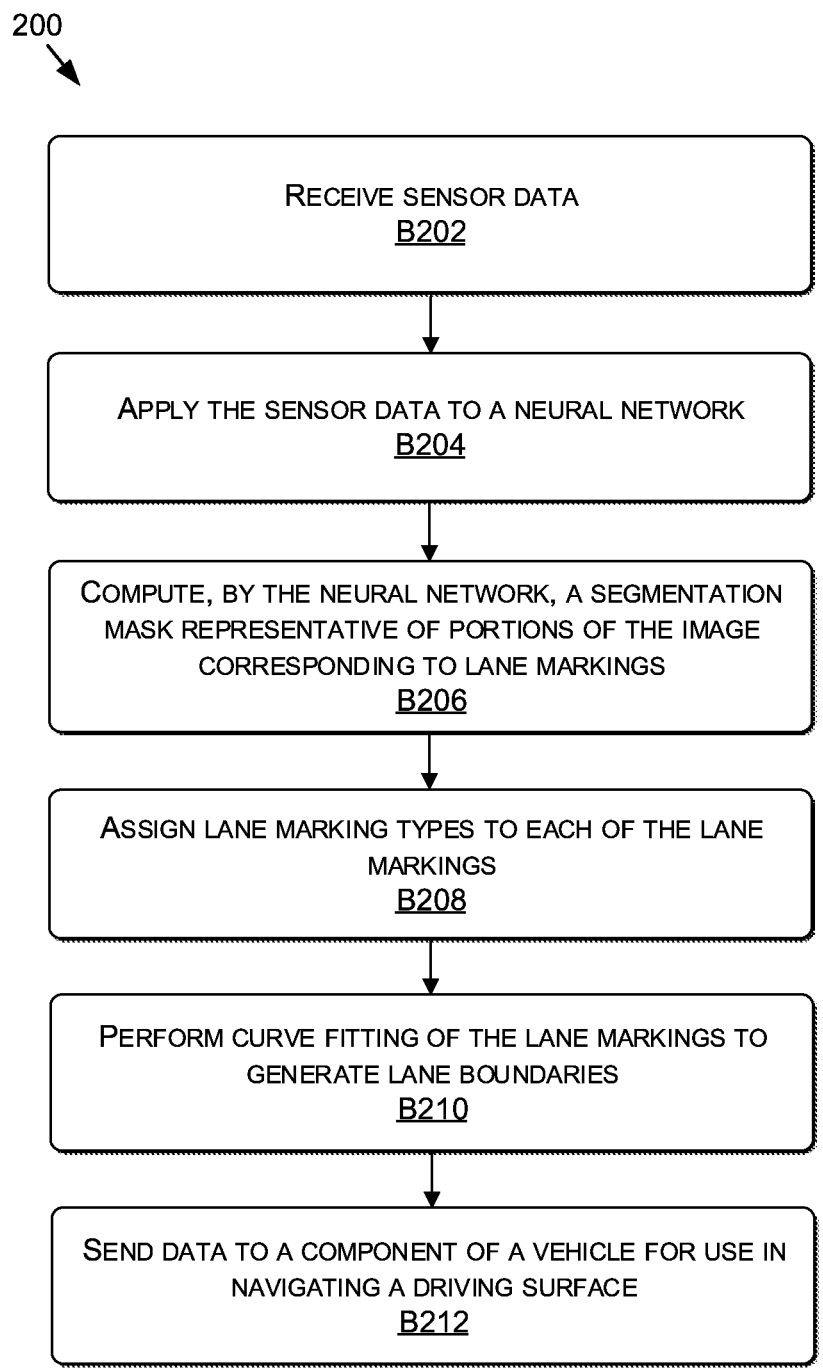
FIG. 2 is a flow diagram illustrating a method for detecting lanes and road boundaries, in accordance with some embodiments of the present disclosure.

Now referring to FIG. 2, each block of method 200, described herein, may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 200 is described, by way of example, with respect to the vehicle 800 and the process 100. However, these methods may additionally or alternatively be executed by any one system, or any combination of systems, including, but not limited to, those described herein.

FIG. 2 is a flow diagram showing a method 200 for detecting lanes and/or road boundaries, in accordance with some embodiments of the present disclosure. The method 200, at block B202, includes receiving sensor data. For example, sensor data 102 may be generated and/or captured by one or more sensors (e.g., cameras, LIDAR sensors, RADAR sensors, etc.) of the vehicle 800 and may be received after generation, capture, and/or pre-processing (e.g., as the sensor data 106). The sensor data 102 and/or 106 may include sensor data (e.g., image data) representative of field(s) of view of one or more sensors. In examples where the sensor data that is received is the sensor data 106, the sensor data 106 may be generated by the sensor data pre-processor 104.

The method 200, at block B204, includes applying the sensor data to a neural network(s). For example, the sensor data 102 and/or 106 representative of field(s) of view of the one or more sensors of the vehicle 800 may be applied to the machine learning model(s) 108.

The method 200, at block B206, includes computing, by the neural network(s), segmentation mask(s). For example, the machine learning model(s) 108 may compute the segmentation mask(s) 110 based at least in part on sensor data 102 and/or the pre-processed sensor data 106. The segmentation mask may include data representative of portions of the sensor data 102, 106 and/or representations thereof (e.g., images) determined to correspond to lane markings and/or boundaries of a driving surface of the vehicle 800.

The method 200, at block B208, includes assigning lane marking types. For example, lane assignment 118 may be performed to assign lane marking types to each of the lane markings and/or boundary markings based at least in part on the segmentation mask(s) 110.

The method 200, at block B210, includes performing curve fitting on the lane markings. For examples, curve fitting 120 may be performed on the lane markings, the boundary markings, and/or on segmentation points of the segmentation mask(s) 110 to generate lane markings and/or boundaries representative of the lane marking types. As described herein, the curve fitting 120 may be based at least in part on the segmentation mask(s) 110.

The method 200, at block B212, includes sending data representative of the lane boundaries to a component of the vehicle at least for use by the vehicle in navigating the driving surface. For example, the data representative of the lane boundaries and/or road boundaries, such as the lane curves and labels 122, may be sent to a planning layer 124, a control layer, a perception layer, a world model management layer, an obstacle avoidance layer, and/or another layer of an autonomous driving software stack of the vehicle 800 for use by the vehicle 800 in navigating the driving surface in the physical environment. As such, the vehicle 800 may use the lane curves and labels 122 to perform various driving maneuvers, such as lane keeping, lane changing, turns, lane merges, lane splits, stopping, starting, slowing down, etc.

Training Machine Learning Model(s)

As described above, conventional systems rely on processing images using various computer vision or machine learning techniques (e.g., from visual indicators identified via image processing) to detect lanes and/or road boundaries. However, these conventional processes are either too computationally expensive to perform accurately in real-time and/or suffer from inaccuracy as a result of shortcuts implemented to reduce computing requirements for realtime deployment. As a result, conventional systems may fail to provide the necessary level of accuracy in detecting lanes and/or road boundaries in real-time.

In contrast, the present system provides for lane and/or road boundary detection in real-time at practically acceptable accuracy levels. To accomplish this, a comparatively small footprint (e.g., less layers than conventional approaches) machine learning model(s) (e.g., a DNN) may be used as part of the lane and road boundary detection system (as described herein). In addition, the machine learning model(s) may be trained using full field of view images, region of interest (ROI) images (e.g., cropped images), and/or a combination thereof in order to increase the accuracy of the DNN in detecting lanes and road boundaries, especially at greater distances. The full field of view images and/or the cropped images may also be downsampled to lower spatial resolutions prior to being input into the machine learning model(s) in order to further increase processing time (e.g., less spatial resolution may result in less nodes and thus less data to process by the model(s)). As a result, the training process, and generation of the training and/or ground truth data, may contribute to increasing the processing speeds for the current system such that lane and road boundary detection may happen in real-time at an acceptable level of accuracy for safe operation of an autonomous vehicle (or other object).

With reference to training the machine learning model(s) (e.g., the DNN), in some examples, the machine learning model(s) may be trained using original images and transformed or augmented versions of the original images. However, in order to accurately train the machine learning model(s) with original and transformed images, ground truth information (e.g., annotations, masks, labels, etc.) associated with the images may also need to undergo similar transformations or augmentations their corresponding images. In some examples, the images may undergo a spatial transformation (e.g., left flip, right flip, zoom in, a zoom out, a random translation, etc.), a color transformation, and/or another transformation type, and the ground truth information (e.g., annotations, masks, labels, etc.) may undergo corresponding transformations.

For example, an original image may be associated with vertices of a polygon (e.g., an annotation of vertices rendered with respect to the original image) representing a lane or a boundary. The original image may undergo a transformation to generate a transformed image. The vertices of the polygon may similarly undergo a transformation (e.g., change in location) to generate a transformed polygon based on the transformation of the image, such that the transformed vertices may be rendered in a corresponding location with respect to the transformed image. A masked image may then be generated by rendering a mask over the portion of the transformed image including the transformed polygon. The machine learning model(s) may be trained using the masked image as ground truth data. This may enable the machine learning model(s) to learn features from a virtually larger set of images, while avoiding overfitting of the model(s) to the training data.

In another non-limiting example, the machine learning model(s) may be trained using down-sampled and/or ROI images. The ROI images may represent a cropped image (e.g., center crop, right crop, left crop, half size, etc.). The cropped image may include a portion of a polygon (e.g., a polygon from the annotations of the original image) representing a lane or boundary outside, and the polygon may extend beyond the cropped portion of the image. In such a case, a ground truth mask may be generated by masking the cropped portion of the polygon in the cropped image using a first mask, and by masking out the portion of the polygon that is outside of the cropped portion of the image using a second mask. As a result, only the portion of the polygon that is within the ROI (e.g., the cropped region) may be masked for the purposes of training the machine learning model(s).

In examples where both the down-sampled and ROI images are used, both images may be applied to the machine learning model(s) at the same time (e.g., as a batch or mini-batch). This may allow the machine learning model(s) to learn features from a more accurate set of points (e.g., pixels) of the image while avoiding learning features from outside of the ROI. In addition, by using down-sampled and/or ROI images, the machine learning model(s) may learn from images with different fields of view, thus increasing the accuracy of the predictions by the machine learning model(s) even with respect to a single image from a single field of view once deployed for lane and boundary detection in an autonomous vehicle. As such, in some examples, the machine learning model(s) may be trained using two or more image types (e.g., an original image, a down-sampled image, an ROI image, etc.), but may only require a single image type for lane and boundary detection once fully trained (e.g., deployed). However, this is not intended to be limiting, and even in deployment, the machine learning model(s) may use two or more image types in a batch or mini-batch. In any example, by training the machine learning model(s) according to these processes, the processing power required for real-time deployment may be reduced because the machine learning model(s) may learn to generate the segmentation mask(s) with images of lower input resolutions than those of conventional systems.

In some examples, labels or annotations (e.g., polygons) may be created (e.g., rendered, drawn, etc.) for lane merges and/or lane splits in a plurality of training images (e.g., ground truth images). The labels or annotations may be tagged (or labeled) as lane merge lane marking or lane split lane marking types, and a tip, top, or point, of the labels or annotations (e.g., a side of the polygon corresponding to the point of lane split or lane merge) may be separately labeled to identify the point of lane split or the point of lane merge on the labels or annotations. The training images may then be used as ground truth data to train the machine learning model(s) to learn to identify (e.g., as part of a segmentation mask) lane merges and lane splits. In examples where the segmentation mask(s) is a multi-class mask, a prediction of a class of lane merge or class of lane split may also be output by the machine learning model(s).

In other examples, the training images may include images of intersections, crosswalks, or a combination thereof. The ground truth information (e.g., annotations, labels, masks, etc.) for these images may include separate labels, annotations, or masks (e.g., polygons) for the crosswalk and/or the intersection. For example, where the image includes a crosswalk at an intersection (e.g., a crosswalk diving intersection lines), the crosswalk may include separate labels from the intersection, such that during training the machine learning model(s) learns to differentiate between the portion of the image corresponds to the crosswalk and the portion of the image that corresponds to the intersection. In examples where the segmentation mask(s) is a multi-class mask, a prediction of a class of crosswalk or class of intersection may be output by the machine learning model(s). Ultimately, the autonomous vehicle implementing the examples where the segmentation mask(s) is a multi-class mask, a prediction of a class of lane merge or class of lane split may also be output by the machine learning model(s) may learn to behave differently where there is a crosswalk, an intersection, or a combination thereof.

Figure 3A:
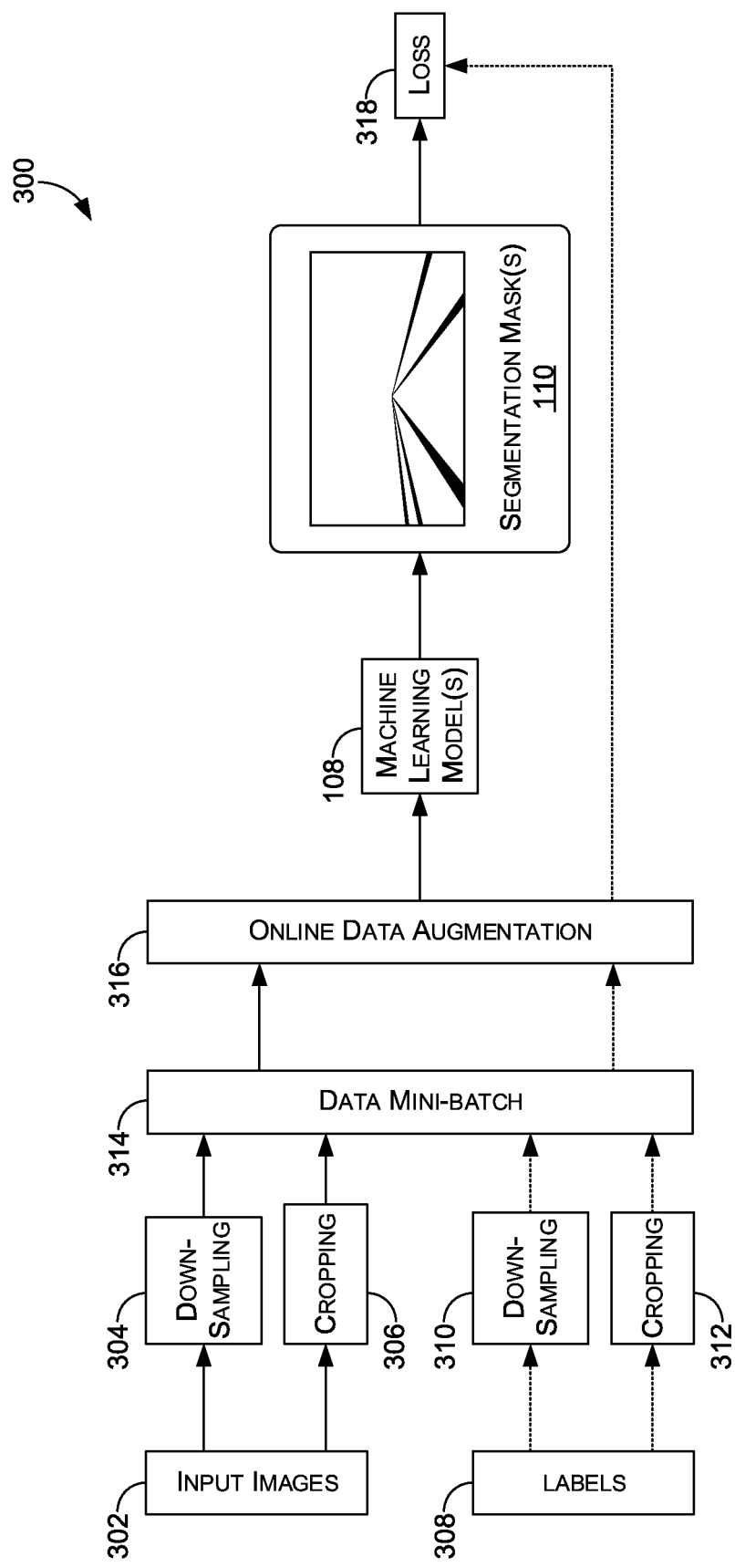
FIG. 3A is a data flow diagram illustrating an example process for training a machine learning model(s) to detect lanes and road boundaries, in accordance with some embodiments of the present disclosure.

Now referring to FIG. 3A, FIG. 3A is a data flow diagram illustrating an example process 300 for training a machine learning model(s) to detect lanes and road boundaries, in accordance with some embodiments of the present disclosure. Although the detections described with respect to FIG. 3A relate to lanes and road boundaries, this is not intended to be limiting, and the detections may also be for crosswalks, intersection, lane splits, lane merges, parking lines, lines within or around a structure (e.g., directional lines within a building for navigating the building, such as for robots, lines of a field or other space for VR applications, etc.), and/or other detections without departing from the scope of the present disclosure.

As described herein, the machine learning model(s) 108 may be trained using original images, down-sampled images, up-sampled images, region of interest (ROI) images, and/or a combination thereof. One or more of these image types may be included within input images 302 used for training the machine learning model(s) 108. The input images 302 may be images captured by one or more sensors (e.g., cameras) of various vehicles (e.g., the vehicle 800), and/or may be images captured from within a virtual environment used for testing and/or generating training images. In some examples, the input images 302 may be images from a data store or repository of training images (e.g., images of driving surfaces including lane markings, boundary markings, crosswalk markings, intersection markings, lane split markings, lane merge markings, etc.). The machine learning model(s) 108 may be trained using both the input images 302 corresponding labels 308 (e.g., as ground truth data) to detect lanes and/or boundaries on driving surfaces. The input images 302 may have corresponding labels 308, which may include annotations, labels, masks, and/or the like. The labels 308 may be generated within a drawing program (e.g., an annotation program), a computer aided design (CAD) program, a labeling program, another type of program suitable for generating the labels 308, and/or may be hand drawn, in some examples. In any example, the labels 308 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). In some examples, for each input image 302, there may be a corresponding label 308.

As illustrated in FIG. 3A, the machine learning model(s) 108 may be trained using both down-sampled (e.g., after down-sampling 304) versions and region of interest (ROI) versions (e.g., after cropping 306) of the input images 302. In some examples, the input image(s) 302 may undergo down-sampling 304. For example, down-sampling 304 may include down-sampling the resolution of the input image 302 by some amount, such as a quarter, a third, a half, a tenth, etc. The ROI images may represent a cropped image (e.g., center crop, half size, etc.) generated after the input images 302 undergo cropping 306. The input images 302 may be cropped to include an area around the vanishing point, a horizontal stripe at a perspective view corresponding to a certain distance at a bird's eye view, a center crop of a higher resolution to provide more information at farther distance, another cropped region, and/or a combination thereof. In an example, the images generated by down-sampling 304 and cropping 306 may be of different resolutions and/or different portions of the fields of view than the input images 302. In such an example, the machine learning model(s) 108 may learn features from a variety of image resolutions and portions of fields of view. The images generated by down-sampling 304 and cropping 306 may then be grouped together in one or more data batches or data mini-batches 314 as training images to be input to the machine learning model(s) 108. In some examples, the size of the data mini-batch(es) 314 may be a tunable hyper-parameter. In one example, the data mini-batch(es) 314 may include an equal number of images from down-sampling 304 and cropping 306.

Figure 3B:
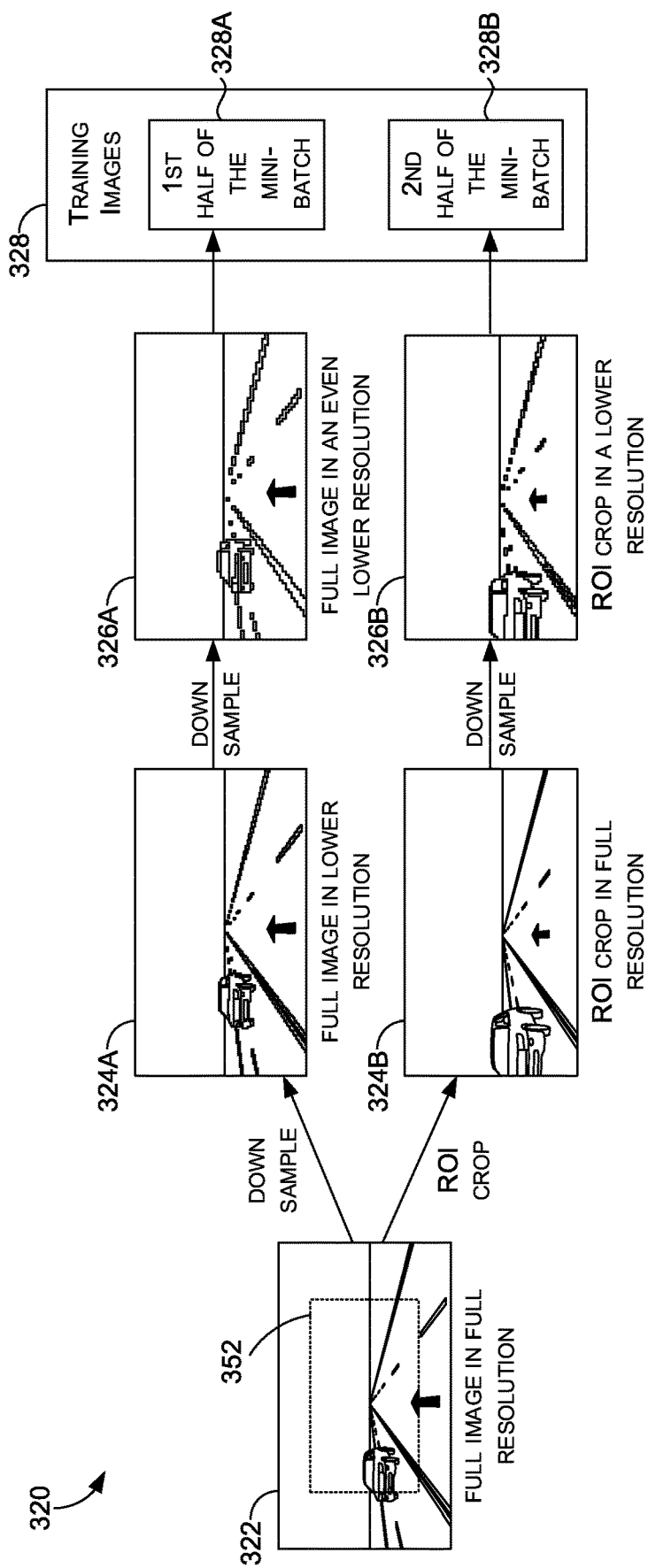
FIG. 3B is a data flow diagram illustrating an example process for generating training images to train a machine learning model(s), in accordance with some embodiments of the present disclosure.

Referring to FIG. 3B, FIG. 3B includes an example of down-sampling 304 and cropping 306 the input images 302. As illustrated in FIG. 3A, a full-resolution image 322 (e.g., one of the input images 302) may be down-sampled to create a first lower-resolution image 324A. The first lower-resolution image 326A may then be down-sampled again, in some examples, to create the second lower-resolution image 324B from the first lower-resolution image 324A. Although two stages of down-sampling 304 are illustrated in FIG. 3B, this is not intended to be limiting, and any number of stages may be used. After down-sampling 304, the resulting images may be used as a first half of the mini-batch 328A for training images 328.

The full-resolution image 322 may also undergo cropping 306 to create a cropped image 324B. The portion of the image that is cropped may correspond to cropped portion 352 included for illustrative purposes only in the full-resolution image 322. The cropped image 324B may, in some examples, be down-sampled (e.g., as part of down-sampling 304) to generate a lower-resolution cropped image 326B. Although only a single down-sampling is illustrated, this is not intended to be limiting, and any number of down-sampling stages may be included on the cropped image 324B. After cropping 306, the resulting images may be used as a second half of the mini-batch 328B for training images 328.

In some examples, the images from down-sampling (e.g., 326B) and the images from cropping (e.g., 326B) may be down-sampled to the same resolution for use as the training images 328. In some examples, the lower-resolution cropped image 326B may be padded (e.g., may have zero-valued pixels added) to create an image of the same resolution as the second lower-resolution image 326A. In other examples, the images may be of different resolutions. In addition, in some examples, cropping 306 and down-sampling 304 may be performed simultaneously, or may be performed at different times.

The labels 308 corresponding to the input images 302 may undergo similar down-sampling 310 and cropping 312 as their corresponding input images 302. Down-sampling 310 may be applied to the labels 308 to reduce the input resolution of the labels 308. In some examples, the down-sampling 310 may reduce the resolution of the labels 308 to the same resolution as down-sampling 304 of the corresponding input images 302. Cropping 312 may be applied to the labels 308 of the input images 302 that were cropped to generate cropped labels. In some examples, cropping 312 may crop the labels 308 in a same manner as cropping 306 of the corresponding input images 302. In other examples, cropping 312 may not be a direct, one-to-one correlation to cropping 306, such as described herein with respect to FIGS. 4A-4C. The labels generated using down-sampling 310 and cropping 312 may be combined in a data mini-batch(es) 314 similar to data mini-batch(es) of their corresponding input images 302, and may be used as ground truth data (e.g., after online data augmentation 316, in examples) for training the machine learning model(s) 108 (e.g., for comparison to the segmentation mask(s) 110 output by the machine learning model(s) 108 using a loss function 318).

In some non-limiting examples, the mini-batch(es) 314, including the images and corresponding labels, may undergo online data augmentation 316 to transform the images and corresponding labels in the mini-batch(es) 314. In examples, the training images 328 may undergo one or more spatial transformations (e.g., left flip, right flip, zoom in, a zoom out, a random translation, etc.) and/or one or more color transformations (e.g., hue, saturation, contrast, etc.), and the training labels 308 may undergo corresponding transformations.

For example, an input image 302 may be associated with a label 308 including vertices of a polygon (e.g., an annotation of vertices for labels 308) representing a lane and/or a boundary. The input image 302 (or the down-sampled or cropped version thereof) may undergo a transformation(s) to generate a transformed image. The vertices of the polygon (e.g., labels 308, or the down-sampled or cropped version thereof) may similarly undergo a transformation (e.g., change in location) to generate transformed vertices based on the transformation of the input image 302. For example, if the input image 302 is rotated thirty degrees, the vertices of the polygon may be transformed to correspond to a location of the vertices in the input image 302 as rotated thirty degrees.

For any input image 302 and/or transformed image, a masked image may then be generated by masking the portion of the transformed image corresponding to the transformed label (e.g., a transformed polygon may be masked that corresponds to the transformed vertices). The machine learning model(s) 108 may be trained using the masked image(s) as ground truth data. A result of online data augmentation 316 is reducing the likelihood of overfitting of the trained machine learning model(s) 108 to the training images and labels, thereby generating a more useful model(s) 108 for deployment in a real-world scenario.

The augmented images generated by online data augmentation 316 may be passed through the machine learning model(s) 108. In some examples, the machine learning model(s) 108 (e.g., a neural network(s)) may be trained with original and/or augmented images using multiple iterations until the value of loss function(s) 318 of the machine learning model(s) 108 is below a threshold loss value. The machine learning model(s) 108 may be trained to generate segmentation mask(s) 110 for each of the original and augmented images. The segmentation mask(s) 110 output by the machine learning model(s) 108 may represent portions of the original and/or augmented image(s) determined to correspond to lane markings, road boundaries, crosswalks, intersections, and/or other features of a driving surface of the vehicle 800.

In some examples, the segmentation mask(s) 110 may include points (e.g., pixels) of the image(s) where lanes, boundaries, and/or other features are determined to be located by the machine learning model(s) 108. In some examples, the segmentation mask(s) 110 generated may be a binary mask(s) (e.g., the binary mask head 334 of FIG. 3C) with a first representation for background elements (e.g., elements other than lanes and boundaries) and a second representation for foreground elements (e.g., lanes and boundaries). In other examples, the machine learning model(s) 108 may be trained to generate a multi-class segmentation mask(s) (e.g., the multi-class mask head 332 of FIG. 3C) as the segmentation mask(s) 110, with different classes relating to different lane markings, boundaries, and/or other features. In such examples, the classes may include a first class for background elements, a second class for road boundaries, a third class for solid lane markings, a fourth class for dashed lane markings, a fifth class for intersections, a sixth class for crosswalks, a seventh class for lane splits, and/or other classes for other features.

The machine learning model(s) 108 may perform forward pass computations on the original and/or augmented images. In some examples, the machine learning model(s) 108 may extract features of interest from the image(s) and predict a probability of a boundary class, a lane marking class, or another feature class in the images (e.g., on a pixel-by-pixel basis). The loss function 318 may be used to measure loss (e.g., error) in the segmentation mask(s) 110 (e.g., predictions generated by the machine learning model(s) 108) as compared to the ground truth data (e.g., the original and/or augmented labels, annotations, and/or masks). In one example, a binary cross entropy function may be used as the loss function 318. In any example, backward pass computations may be performed to recursively compute gradients of the loss function with respect to training parameters. In some examples, weight and biases of the machine learning model(s) 108 may be used to compute these gradients. For example, region based weighted loss may be added to the loss function 318, where the loss function 318 may increasingly penalize loss at farther distances from the bottom of the image, as described herein. In such a case, the region-based weight loss may be represented as follows in equation (1):

Weighted Loss = (1)

$$-\frac{1}{H*W}\sum_{h=0}^{H-1}\sum_{w=0}^{W-1} Weight_{h,w}[y_{true,h,w}*\log(y_{pred,h,w}) + (1 - y_{true,h,w})*\log(1 - y_{pred,h,w})]$$

where $Weight_{h,w}$ represents the weight coefficients along two-dimensional, height (h)×width (w), output segmentation mask(s) 110, $Y_{true}$ represents the ground truth location, and $Y_{pred}$ represents the predicted location output by the machine learning model(s) 108. In some examples, $Y_{true}$ may be 0 or 1 and $Y_{pred}$ may be a float value between 0 and 1. A vanilla loss function, a special case where $Weight_{h,w}=1$ for all h, w, treats every region the same. However, a region based weighted loss function penalizes more errors on the far distance, and therefore improves the detection in the far distance. In some examples, the weighted coefficients may be set as a function of row numbers of the images.

In some examples, the machine learning model(s) 108 may be trained using both a multi-class mask head 332 (e.g., multi-class mask including heads, 332A-332C, for each class) and a binary mask head 334. In some examples, the binary mask head 334 may be derived from the multi-class mask head 332. However, deriving the binary mask head 334 from the multi-class mask head 332 may result in a binary mask head 334 that does not perform as well as a separately trained binary mask head 334.

Figure 3C:
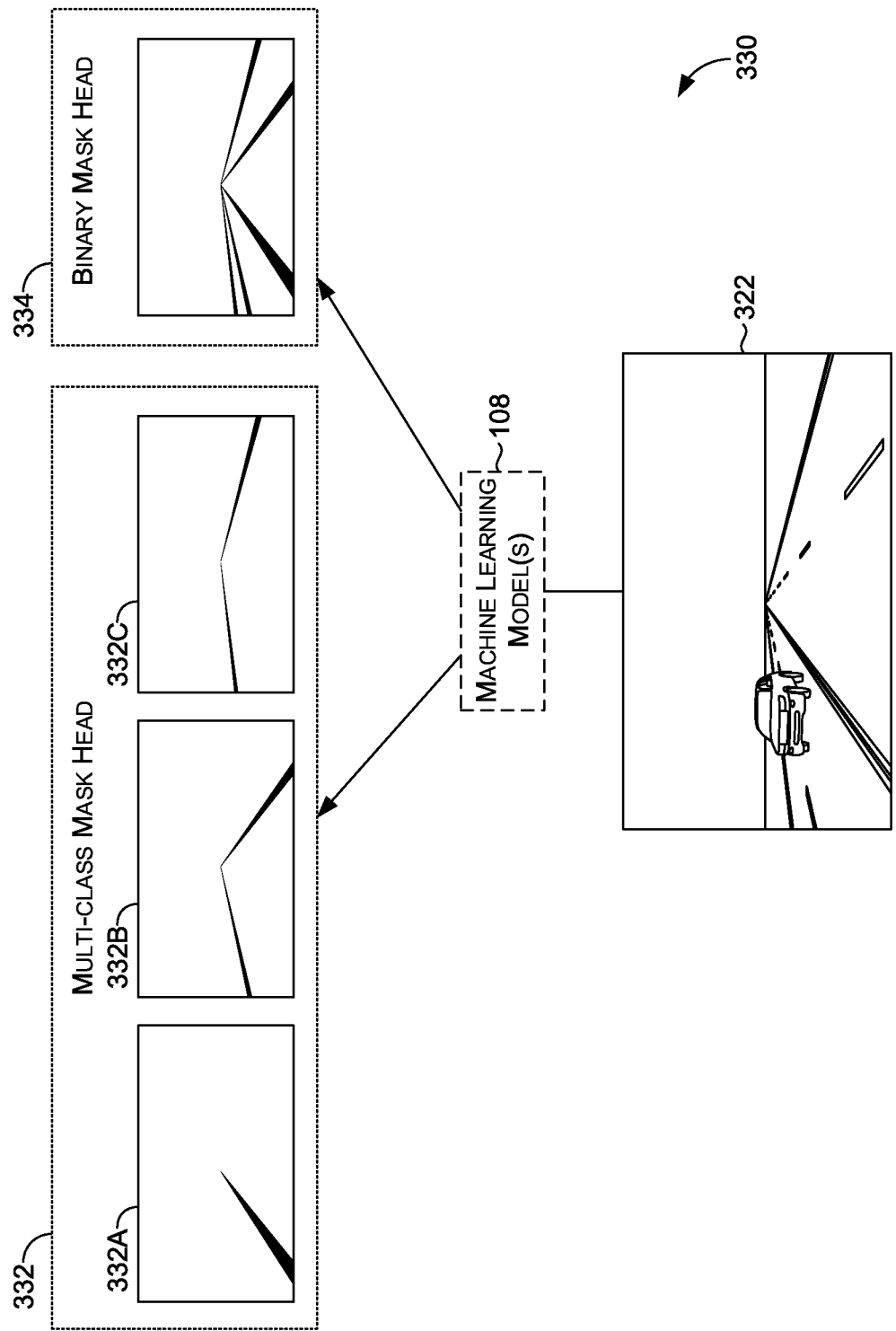
FIG. 3C includes a data flow diagram illustrating an example process for training a machine learning model(s) using a multi-class mask head and/or a binary mask head, in accordance with some embodiments of the present disclosure.

As such, with reference to FIG. 3C, both the multi-class mask head 332 and the binary mask head 334 may be trained (e.g., jointly). The original and/or augmented images may be input to the machine learning model(s) 108, and the machine learning model(s) 108 may be trained to output both the multi-class mask head 332 and the binary mask head 334. In some non-limiting examples, the multi-class mask head loss may include independent binary cross entropy for each class in the multi-class mask. In that case, the loss function 318 may be calculated as a total loss (equation (4)) of the multi-class mask head loss (equation (2)) and the binary mask head loss (equation (3)), as follows:

Multiclass Loss = (2)

$$-\frac{1}{C*H*W}\sum_{c=0}^{C-1}\sum_{h=0}^{H-1}\sum_{w=0}^{W-1} [y_{true,c,h,w}*\log(y_{pred,c,h,w}) + (1 - y_{true,c,h,w})*\log(1 - y_{true,c,h,w})]$$

Binary Loss = $-\frac{1}{H*W}$ (3)

$$\sum_{h=0}^{H-1}\sum_{w=0}^{W-1} [y_{true,h,w}*\log(y_{pred,h,w}) + (1 - y_{true,h,w})*\log(1 - y_{pred,h,w})]$$

Total Loss = a * multiclass_head_loss + binaryMask_head_loss (4)

where C is the number of classes of the multi-class mask head (e.g., multi-class mask), H is the height of the output tensor, W is the width of the output tensor, and a is the loss weight between the two heads. In some examples, a may be a hyper-parameter that may be optimized.

In another non-limiting example, multi-class mask head loss may use multi-class cross entropy (equation (5)) or a weighted cross entropy (equation (6)) calculated as follows:

$$Multiclass\ Loss = -\frac{1}{C*H*W}\sum_{c=0}^{C-1}\sum_{h=0}^{H-1}\sum_{w=0}^{W-1} [y_{true,c,h,w}*\log(t_{pred,c,h,w})] \quad (5)$$

Weighted Loss = (6)

$$-\frac{1}{C*H*W}\sum_{c=0}^{C-1} Weight_c \sum_{h=0}^{H-1}\sum_{w=0}^{W-1} [y_{true,c,h,w}*\log(y_{pred,c,h,w})]$$

Figure 3D:
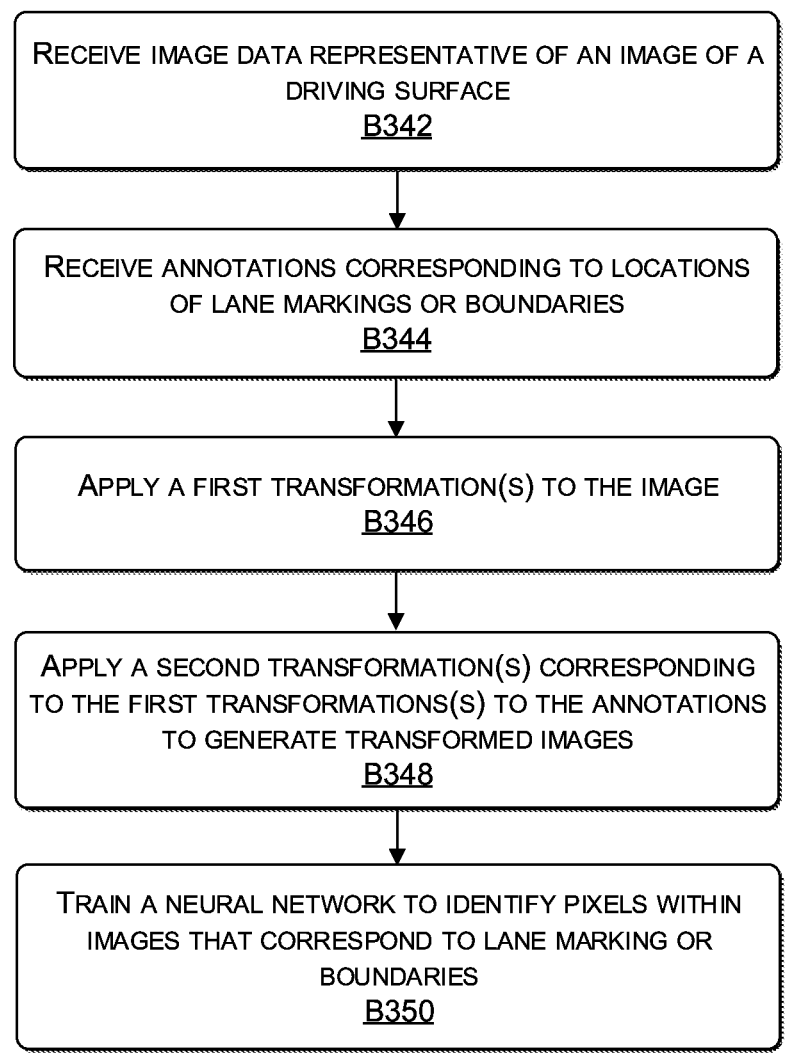
FIG. 3D is a flow diagram illustrating a method for training a machine learning model(s) to detect lanes and road boundaries using transformed images and transformed labels as ground truth data, in accordance with some embodiments of the present disclosure.

Now referring to FIG. 3D, each block of method 340, described herein, may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 340 is described, by way of example, with respect to the vehicle 800 and the process 300. However, these methods may additionally or alternatively be executed by any one system, or any combination of systems, including, but not limited to, those described herein.

FIG. 3D is a flow diagram showing a method 340 for training a neural network to detect lanes and boundaries using transformed images and labels, in accordance with some embodiments of the present disclosure. The method 340, at block B342, includes receiving image data representative of an image of a driving surface. For example, image data may be received that is representative of input images 302, where the input images 302 include representations of driving surfaces of the vehicle 800. In some examples, the input images 302 may be stored in a data store or a repository.

The method 340, at block B344 includes receiving annotations corresponding to locations of at least one of lane markings or boundaries of the driving surface. For example, labels 308 corresponding to the input images 302 may be received. The labels 308 may include ground truth information corresponding to lanes, boundaries, and/or other features of the driving surface represented in the corresponding input images 302.

The method 340, at block B346 includes applying one or more transformations to the image to generate a transformed image. For example, online data augmentation 316 (e.g., spatial transformations, color transformations, etc.) may be performed on the input images 302 to generate transformed images.

The method 340, at block B348 includes applying one or more second transformations corresponding to the one or more first transformations to each of the annotations to generate transformed annotations. For example, online data augmentation 316 may be performed on the labels 308 to generate augmented labels. In some examples, the labels 308 may be transformed using similar or corresponding transformation as the transformations of the input images 302.

The method 340, at block B350 includes training a neural network using the image, the annotations, the transformed image, and the transformed annotations. For example, the machine learning model(s) 108 may be trained to identify pixels within training images 328 (e.g., down-sampled and/or cropped versions of the input images 302), augmented training images, training labels (e.g., down-sampled and/or cropped versions of the labels 308), and/or augmented training labels. The training labels and augmented training labels may be used as ground truth data to train the machine learning model(s) 108 to detect corresponding lane marking, road boundaries, and/or other features of the driving surface.

Figure 4A:
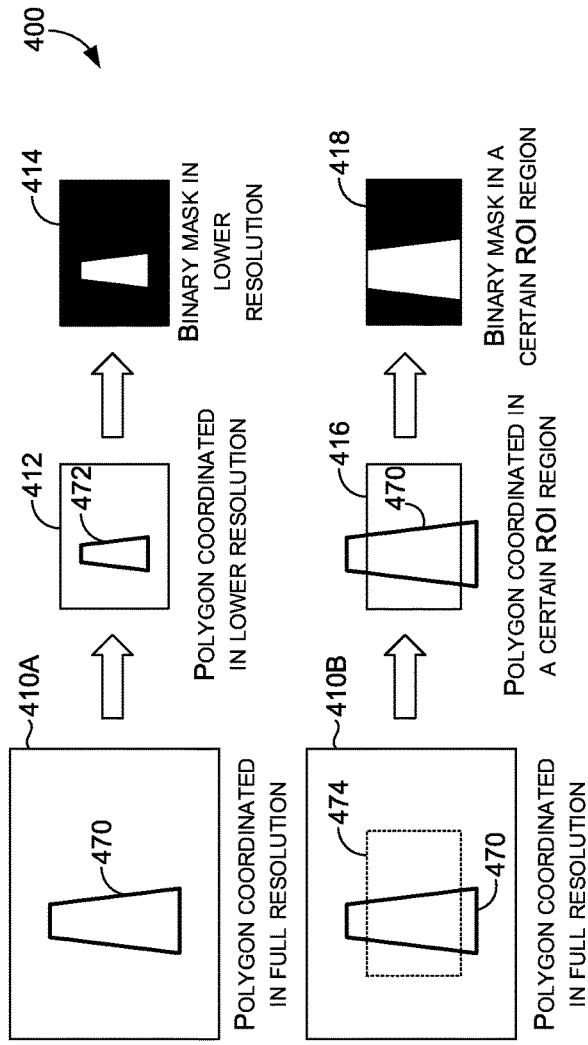
FIG. 4A is a data flow diagram illustrating an example process for generating ground truth data to train a machine learning model(s) to detect lanes and road boundaries, in accordance with some embodiments of the present disclosure.

Referring to FIG. 4A, FIG. 4A is an illustration of an example process 400 for generating ground truth data to train a machine learning model(s) to detect lanes, road boundaries, and/or other features, in accordance with some embodiments of the present disclosure. For example, online data augmentation 316 may be performed on polygon vertices received as labels 308 during ground truth generation. When an input image 302 associated with the labels 308 goes through down-sampling 304, the same down-sampling may be applied to the labels 308 (e.g., the polygon vertices) corresponding to the input image 302. Similarly, when an input image 302 goes associated with the labels 308 goes through cropping 306, the labels 308 must be adjusted. The polygons (e.g., polygon 470) generated from the polygon vertices, or other label types (e.g., lines) from the labels 308, may represent lanes, road boundaries, and/or other features depicted in the corresponding input images 302.

Full-resolution images 410A and 410B may include the polygon 470 that may be in full-resolution. The polygon 470, as described herein, may be generated from polygon vertices as part of the ground truth mask generation, or may be generated in a single step (e.g., drawn or otherwise generated without first having vertices). Generating polygons from polygon vertices to represent ground truth data for lane markings, road boundaries, and/or other features is further described herein, at least with respect to FIGS. 5A and 5B. Although FIGS. 4A-4D are described with respect to polygons as the ground truth mask, this is not intended to be limiting. For example, labels 308 of other shapes (e.g., lines, circles, amorphous shapes, etc.) may be used without departing from the scope of the present disclosure.

The full-resolution image 410A and the associated polygon 470 (e.g., a ground truth mask) may be down-sampled (e.g., using down-sampling 304) to generate a down-sampled image 412 with a down-sampled version of the polygon 472. For example, the full-resolution image 410A may be down-sampled, and then the down-sampling of the full-resolution image 410A may be used to inform the down-sampling of the polygon vertices, and the down-sampled polygon 472 may be generated from the down-sampled polygon vertices. The down-sampled polygon 472 may then be masked to represent the portion of the down-sampled image 412 that corresponds to the lane marking, boundary, and/or other feature. In some examples, the mask may be generated by using a canvas to mask out pixels (or portions of the down-sampled image 412) outside of the down-sampled polygon 472. The mask may correspond to a binary mask (e.g., as illustrated in masked image 414), where the down-sampled polygon 472 may be a first color (e.g., white) and the pixels outside of the down-sampled polygon are a second color (e.g., black). However, the masked image 414 may also be used to train a multi-class mask, as described herein. The masked image 414 may then be used as ground truth data to train the machine learning model(s) 108 to detect lane markings, road boundaries, and/or features that correspond to the location of the down-sampled polygon 472 in real-world coordinates.

The full-resolution image 410B and the associated polygon 470 (e.g., a ground truth mask) may be cropped (e.g., using cropping 306) to generate a cropped or ROI image 416. However, after cropping 306, the corresponding labels 308 (e.g., the polygon 470) must also be adjusted or transformed to map to the ROI image 416. For example, while cropping 306 the polygon 470, it may be determined that a portion of the polygon 470 is outside of the ROI image 416 (e.g., extends beyond ROI 474 of the full-resolution image 410B used to generate the cropped image 416). In such examples, a canvas may be used to augment the polygon vertices (e.g., four corners of the polygon 470) such that the canvas masks out the pixels of the polygon outside of the ROI 474, as can be seen by the portion of the polygon 470 in masked image 418. Once the updated (e.g., within the ROI 474) polygon vertices are determined, any augmentations or transformations to the cropped image 416 may also be applied to the updated polygon vertices, as described herein. The masked image 418 may then be used as ground truth data to train the machine learning model(s) 108 to detect lane markings, road boundaries, and/or other features.

Figure 4B:
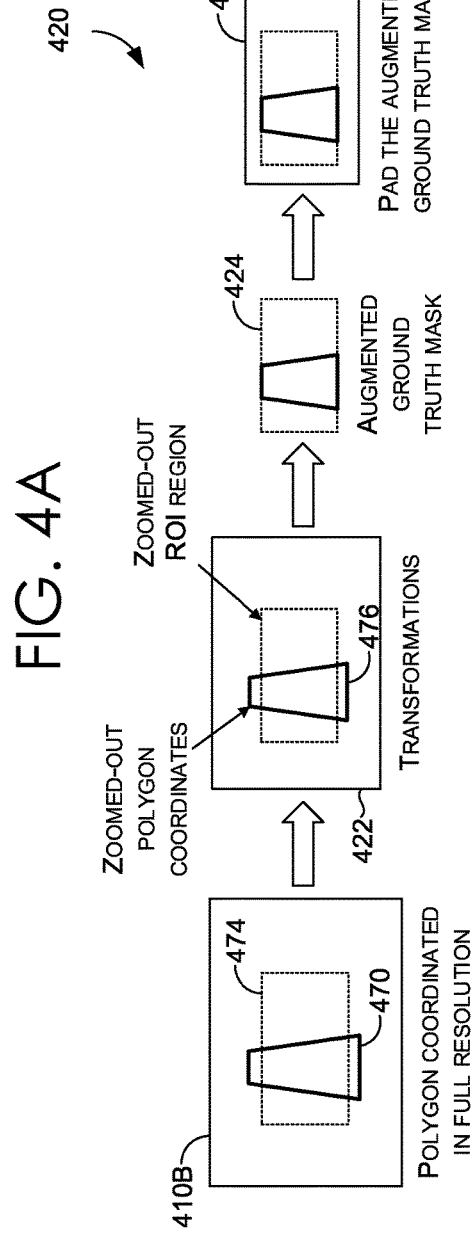
FIG. 4B is a data flow diagram illustrating an example process for performing data augmentation and cropping of ground truth masks, in accordance with some embodiments of the present disclosure.

Now referring to FIG. 4B, FIG. 4B is an illustration of an example process 420 for performing online data augmentation and cropping of ground truth masks, in accordance with some embodiments of the present disclosure. The full-resolution image 410B with the polygon 470 (e.g., as a label 308) may be received that corresponds to an input image 302. The full-resolution image 410B may include the ROI 474 for cropping 306 to generate a cropped image. One or more spatial transformations (e.g., zoom-in, zoom-out, flip right, flip left, etc.) may be performed on the cropped image and correspondingly to the polygon 470 (e.g., to the vertices of the polygon using online data augmentation 316) to generate a transformed image 422 with a transformed polygon 476. The spatial transformation illustrated in FIG. 4B may be a zoom-out transformation, however, the spatial transformations are not so limited. An augmented or transformed ground truth mask 424 may be generated within the ROI 474 by determining the transformed polygon vertices and masking out the region outside of the ROI 474.

In some examples, the augmented ground truth mask 424 may be padded (e.g., may have zero-valued pixels added to increase the spatial resolution) to a desired size for the training images 328. In some examples, the padding is implemented using a canvas, such that the augmented ground truth mask sits within the canvas, and the canvas provides the padding. Ultimately, a padded image 426 may be used as ground truth data for training the machine learning model(s) 108 to detect lane markings, road boundaries, and/or other features.

Figure 4C:
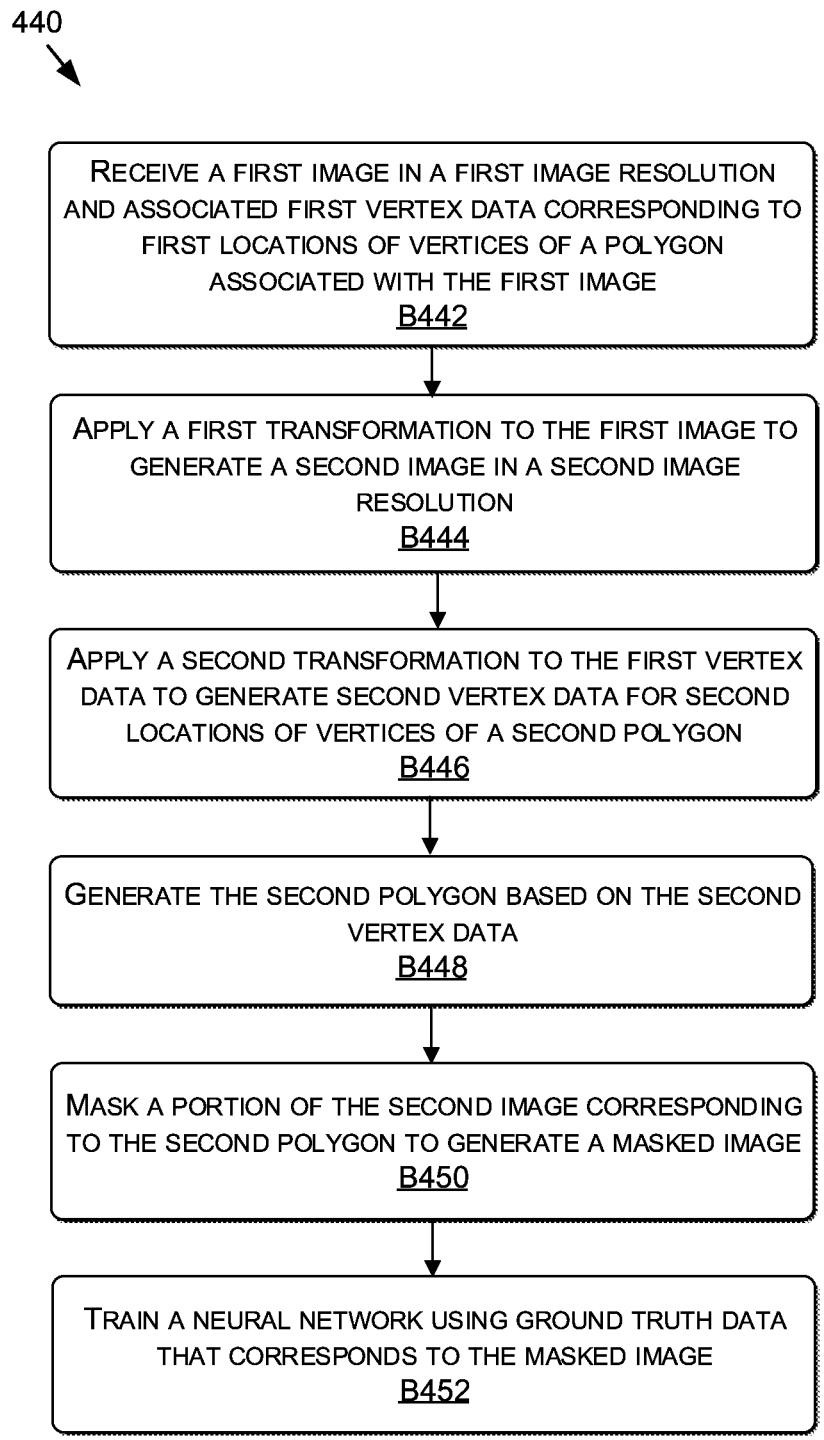
FIG. 4C is a flow diagram illustrating a method for training a machine learning model(s) to detect lanes and road boundaries using down-sampled images and/or ground truth masks, in accordance with some embodiments of the present disclosure.
Figure 4D:
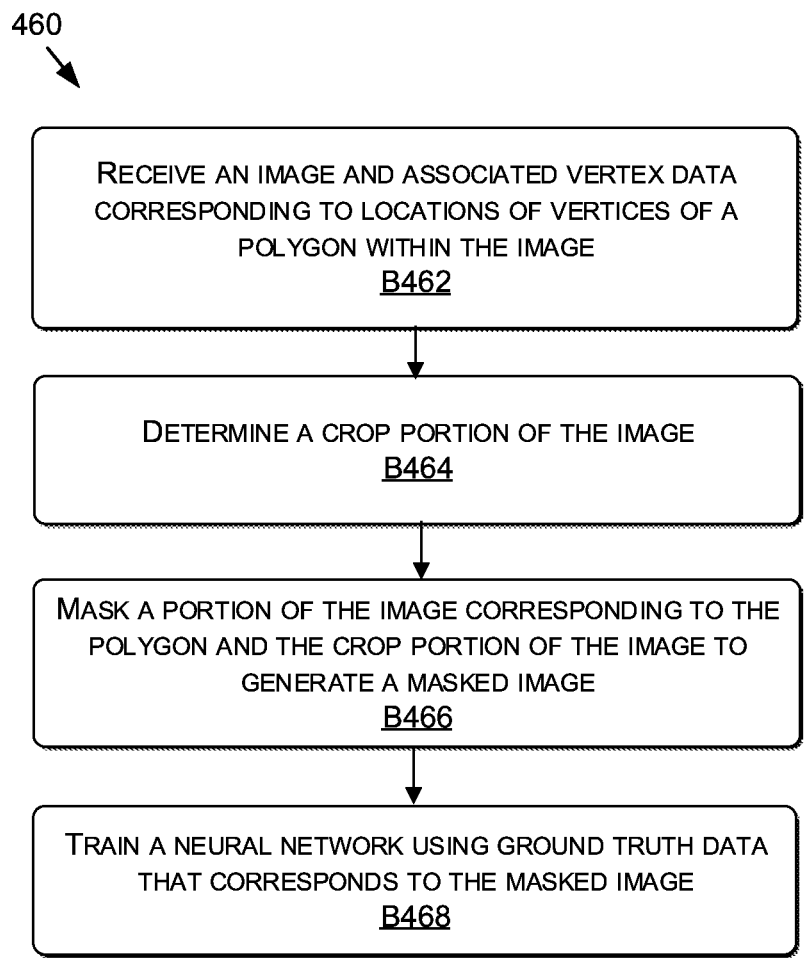
FIG. 4D is a flow diagram illustrating a method for training a machine learning model(s) to detect lanes and road boundaries using cropped images and/or ground truth masks, in accordance with some embodiments of the present disclosure.

Now referring to FIGS. 4C-4D, each block of methods 440 and 460, described herein, may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 440 and 460 are described, by way of example, with respect to the vehicle 800 and the processes 300, 320, 400 and/or 420. However, these methods may additionally or alternatively be executed by any one system, or any combination of systems, including, but not limited to, those described herein.

FIG. 4C is a flow diagram showing a method 440 for training a neural network to detect lanes and boundaries using down-sampled images, in accordance with some embodiments of the present disclosure. The method 440, at block B442, includes receiving a first image in a first image resolution and associated first vertex data corresponding to first locations of vertices of a polygon associated with the first image. For example, an input image 302 (e.g., the full-resolution image 410A) and associated labels 308 may be received, where the input image 302 has a first resolution and the labels 308 are represented as first vertex data corresponding to a polygon 470 of a lane, boundary, or other feature.

The method 440, at block B444, includes applying a first transform to the first image to generate a second image in a second image resolution. For example, down-sampling 304 may be applied to the input image 302 to convert the input image 302 to the first lower resolution image 324A and/or the second lower resolution image 326A.

The method 440, at block B446, includes applying a second transform to the first vertex data to generate second vertex data corresponding to second locations of vertices of a second polygon within the second image based at least in part on the first transform. For example, a second set of vertex data for a down-sampled polygon 472 may be generated by down-sampling the polygon 470 corresponding to the down-sampling of the input image 302.

The method 440, at block B448, includes generating the second polygon for the second image based at least in part on the second vertex data. For example, the down-sampled polygon 472 may be generated based on the second vertex data.

The method 440, at block B450, includes masking at least a portion of the second image that corresponds to the second polygon to generate a masked image. For example, a binary mask in lower resolution 414 may be generated based on the second set of vertices by masking the down-sampled polygon 472 to generate the masked image 414.

The method 440, at block B452, includes training a neural network using ground truth data that corresponds to the masked image. For example, the machine learning model(s) 108 may be trained using the masked image 414 as ground truth data.

Now referring to FIG. 4D, FIG. 4D is a flow diagram showing a method 460 for training a neural network to detect lanes and boundaries using cropped images, in accordance with some embodiments of the present disclosure. The method 460, at block B462, includes receiving an image and associated vertex data corresponding to locations of vertices of a polygon within the image. For example, an input image 302 (e.g., the full-resolution image 410B) and associated labels 308 may be received where the labels 308 are represented as vertex data corresponding to locations of vertices of a polygon 470 within the input image 302.

The method 460, at block B464, includes determining a crop portion of the image, at least a portion of the polygon being outside of the crop portion. For example, the ROI 474 may be determined, and the cropped image 416 may be generated. After cropping 306, at least a portion of the polygon 470 may be outside of the ROI 474.

The method 460, at block B466, includes masking at least a portion of the image that corresponds to the polygon and the crop portion of the image to generate a masked image. For example, a first mask may be generated to mask out the portion of the polygon 470 that is outside of the ROI 474 and a second mask may be generated within the ROI 474 to mask the portion of the cropped image 416 that corresponds to the lane, boundary, and/or other feature. The first and second masks may be applied to generate the masked image 418.

The method 460, at block B468, includes training a neural network using ground truth data that corresponds to the masked image. For example, the machine learning model(s) 108 may be trained using the masked image 418 as ground truth data.

Annotating Features of a Driving Surface

In some examples, annotations of features of a driving surface, such as lanes, boundaries, crosswalks, intersections, lane merges, lane splits, and/or other features may be used to generate ground truth data for training a machine learning model(s). For example, an image may be received along with annotations indicating marked vertices representing vertices of a polyline. Line segments (e.g., polylines) may then be generated to join adjacent vertices. The polylines may then be expanded into corresponding polygons. As a non-limiting example, for each of the vertices, an adjacent vertex may be generated such that the adjacent vertex is perpendicular to a polyline extending from the vertex. A set of second polylines may then be generated between the vertex and the adjacent vertex, and a set of third polylines may then be generated between corresponding adjacent vertices. The first polyline, the second polylines, and the third polyline may form a polygon that may represent a portion of a boundary, lane, or other feature of a driving surface, and together the polygons may represent the boundary, lane, and/or other feature of the driving surface (e.g., as a ground truth mask). In some examples, the width of the polygons (e.g., the length of the set of second polylines) may be based on the distance of the corresponding second polyline from the bottom of the image (e.g., relative to the camera or other sensor). In such examples, the width of the polygons, and the corresponding length of the second polylines, may decrease from the bottom of the image toward the top.

By generating the polygons in this way for ground truth data, the accuracy of the machine learning model(s) may be improved, and the efficiency of creating the ground truth data may be increased. For example, because polylines are generated from vertices, the resulting polyline is already more accurate than a fully hand drawn or computer generated line, and by expanding the polylines to polygons, the accuracy is further increased.

In some embodiments, these polygons may be generated or rendered with respect to an image to generate a visible, rendered line that delineates a road boundary, a lane marking, and/or another feature, even when no road boundary or lane markings are actually present in the image (e.g., due to occlusion from other objects, from weather, when non-existent, etc.). For example, by generating ground truth data in this way, the machine learning model(s) may be trained to recognize transitions from pavement to a different surface (e.g., dirt, gravel, sand, etc.), pavement to a concrete barrier, pavement to a curb, gravel to dirt, etc. Advantageously, this technique may also allow for training the machine learning model(s) to generate full and accurate detection of lanes and boundaries even for adverse, or non-ideal, weather and road conditions.

Figure 5A:
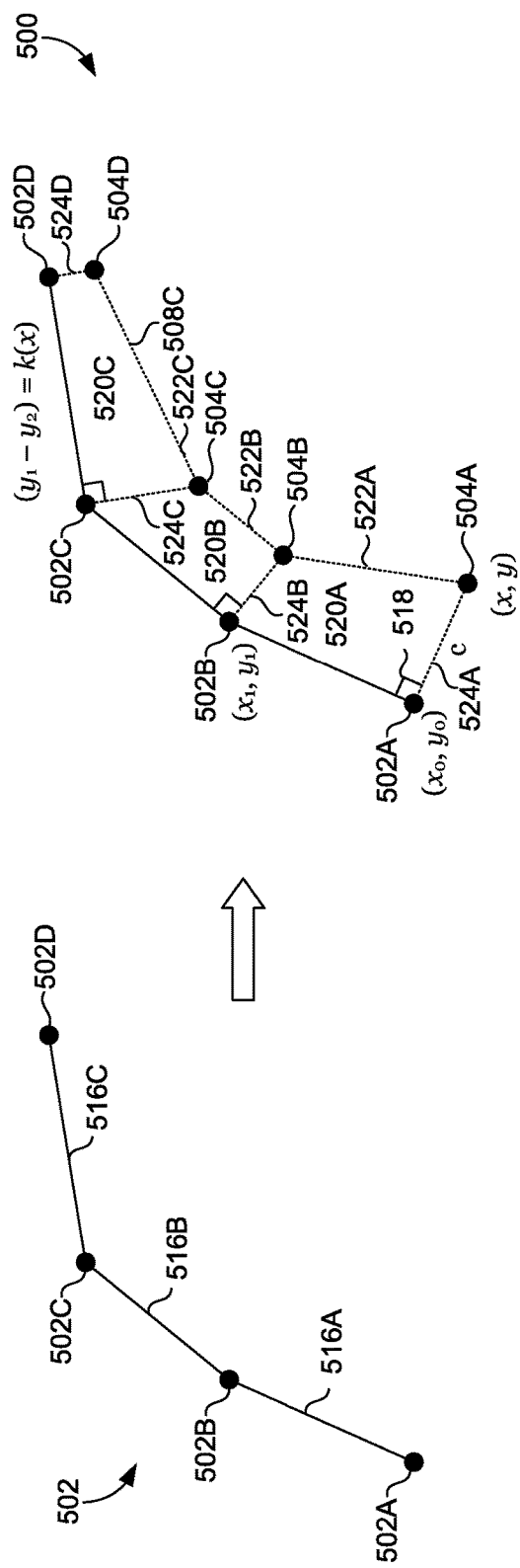
FIG. 5A is an illustration of an example process for annotating road boundaries for ground truth data, in accordance with some embodiments of the present disclosure.

Now referring to FIG. 5A, FIG. 5A is an illustration of an example process 500 for annotating road boundaries for generating ground truth data, in accordance with some embodiments of the present disclosure. The annotation described with respect to FIG. 5A may relate to a road boundary annotation, however, this is not intended to be limiting. For example, similar annotations may be made for lanes, crosswalks, intersections, parking lines, and/or other features of a driving surface, or other features of non-driving surfaces, such as fields, poles or other vertical or elongate structures, etc.

Road boundary annotation may include labeling a set of first vertices 502A-502D, where the first vertices 502 may correspond to points (e.g., pixels) within an image. In some examples, the vertices 502 may be labeled along a transition from one surface to another, as described herein. In any example, the first vertices 502 may correspond to a road boundary, a lane marking, and/or another feature of an environment (e.g., real-world or virtual) represented within an image. First polylines may be generated between adjacent first vertices 502. For example, first polylines 516A-516C may be extended between each of the adjacent vertices 502A and 502B, 502B and 502C, 502C and 502D, and so on.

The first polylines 516 may then be expanded into polygons, such as 520A, 520B and 520C. This may be done by generating second vertices 504A-504D adjacent the first vertices 502 that correspond to the first polylines 516, the second vertices 504 may be spaced from the first vertices 502 along a direction perpendicular to the first polylines 516 (e.g., as indicated by the right angle, such as right angle 518). In one non-limiting example, locations of the second vertices 504 with respect to the first vertices 502 may be determined based at least in part on a distance of the first vertices 502 from the bottom of the image. For example, the locations of the second vertices 504 may be determined such that that the second vertices 504 are spaced closer to the first vertices as the distance of the first vertices 502 increases with respect to the bottom of the image. For example, a location of the second vertex 504A may be a greater distance (e.g., along a line perpendicular to the first polyline 516A) from the first vertex 502A than the second vertex 504B is placed from the first vertex 502B (e.g., along a line perpendicular to the first polyline 516B), and so on. In some examples, the locations of the second vertices 504 may be determined based on a slope of the previous polyline or first polyline 516. For example, the location of the second vertex 504B may be determined based on the slope of the first polyline 516A joining first vertices 502A and 502B. By generating polygons 520 such that the polygons 520 are gradually less wide as the distance from the bottom of the image increases, the accuracy of the machine learning model(s) 108, especially at predicting lanes, boundaries, and/or other features at a distance, may be increased.

Second polylines 522 may be generated that extend between adjacent second vertices 504. For example, a line segment may be extended between each of the adjacent vertices 504A and 504B, 504B and 504C, 504C and 504D, and so on, to generate the second polylines 522.

Third polylines 524 may be generated that extend between corresponding first vertices 502 and second vertices 504. For example, line segments may be extended between vertices 502A and 504A, 502B and 504B, 502C and 504C, and 502D and 504D, and so on to generate the third polylines 524. The polygons 520 may then be used as annotations for labels 308 of ground truth data to train the machine learning model(s) 108 to detect boundaries, roads, and/or other features.

In some examples, the first vertices 502 and the second vertices 504 may be determined, and the vertices may be used as the vertex data—as described herein—that may be augmented during augmentation or transformation of the images and labels. As such, the vertices 502 and 504 may be used as preliminary annotations, and after augmentation of the vertices 502 and 504, the polygons 520 may then be generated. In other examples, the polygons 520 may be generated, and the entire polygon may undergo the augmentations and/or transformations.

Figure 5B:
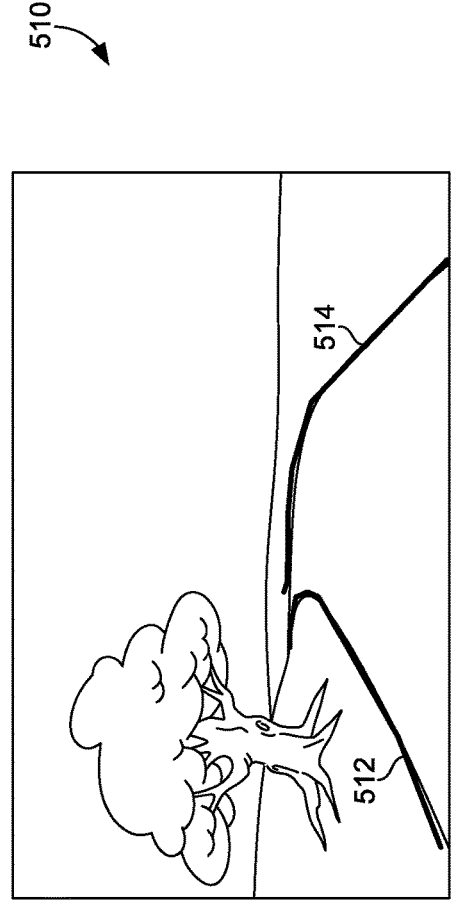
FIG. 5B is an illustration of an example road boundary annotation, in accordance with some embodiments of the present disclosure.

Now referring to FIG. 5B, FIG. 5B is a diagram illustrating an example road boundary annotation 510, in accordance with some embodiments of the present disclosure. A road boundary may be any visible boundary at the edge of the road that is drivable. Road boundaries may also include transitions from pavement to dirt, pavement to a concrete barrier or curb, etc. While training the machine learning model(s) 108, a polygon may be drawn to include a visible line that indicates road boundaries as described herein, at least with respect to FIG. 5A. In some examples, the machine learning model(s) 108 may be trained using annotations for lanes and boundaries on a road without lane or boundary markings In such an example, road boundaries may be annotated as labels 308 (e.g., lines 512 and 514) on roads where no markings are visible. This may enable the machine learning model(s) 108 to learn a variety of patterns for road boundaries, lane markings, and/or other features.

In some examples, road boundaries may be annotated as polygons using the process described with respect to FIG. 5A, even when there are conflicting lane markings in the images. For example, boundaries may be annotated when there is a solid yellow or solid white line at the end of the road, or when other lines are very close in the images. This may enable the machine learning model(s) 108 to learn different patterns and to enable lane-keeping on a road with incorrect lane markings, which may be more common on local and/or rural roads (e.g., surface streets).

A variety of annotations may be used during training to train the machine learning model(s) 108 to accurately detect occluded lane markings and boundaries, in addition to those included herein. For example, the machine learning model(s) 108 may be trained using annotations for extending lanes beyond or through a vehicle or other object on the driving surface that may be occluding at least a portion of the lane marking, boundary, and/or other feature. The machine learning model(s) 108 may also be trained using images and labels annotating lanes and boundaries occluded as result of weather or road conditions, such as during rain and/or when snow is covering the driving surface. As such, the current system may be able to accurately detect lanes and boundaries in real-time, even with less than ideal weather and/or road conditions.

Figure 5C:
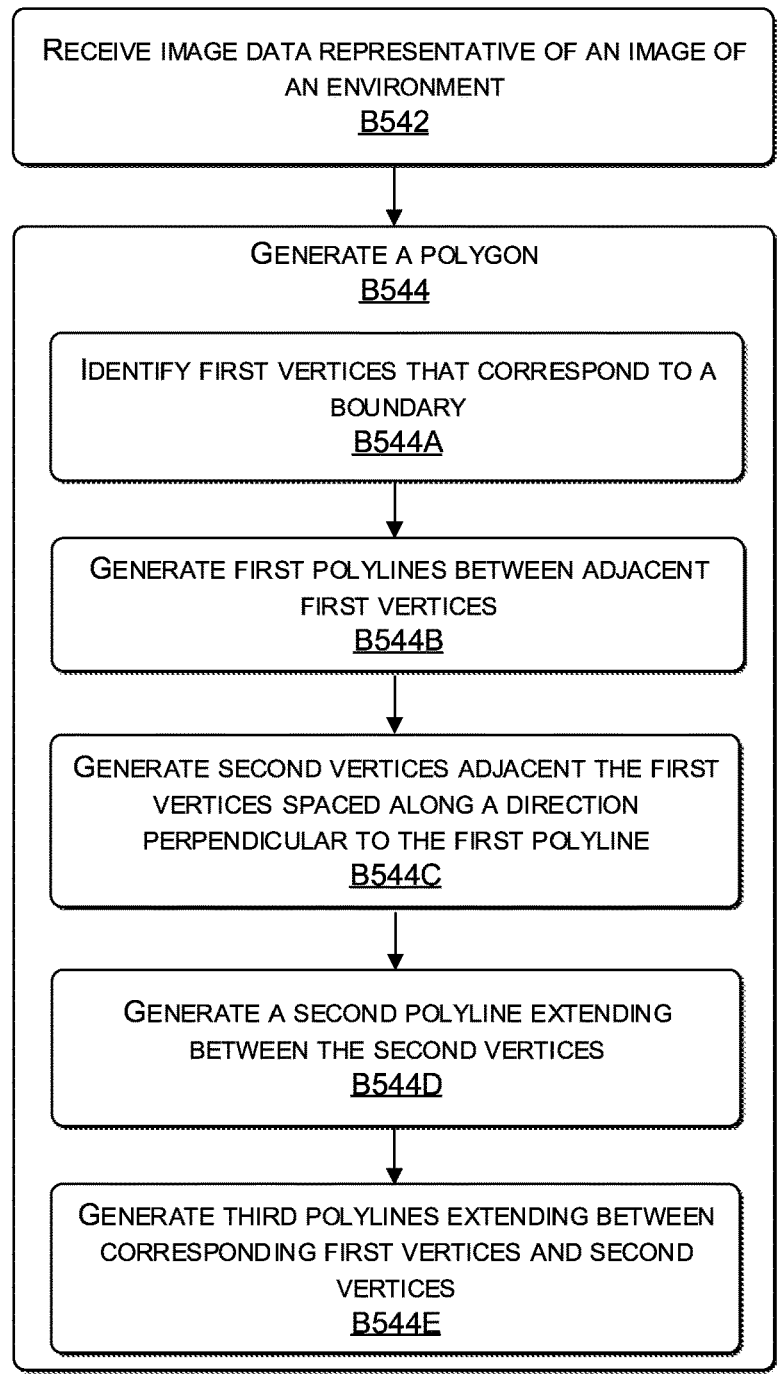
FIG. 5C is a flow diagram illustrating a method for annotating road boundaries for ground truth generation, in accordance with some embodiments of the present disclosure.

Now referring to FIG. 5C, each block of method 540, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 540 is described, by way of example, with respect to the vehicle 800 and the process 500. However, these methods may additionally or alternatively be executed by any one system, or any combination of systems, including, but not limited to, those described herein.

FIG. 5C is a flow diagram showing a method 540 for annotating road boundaries for ground truth generation, in accordance with some embodiments of the present disclosure. The method 540, at block B542, includes receiving image data representative of an image of an environment. For example, image data may be received that represented one or more images of a physical environment including a driving surface(s).

The method 540, at block B544, includes generating a polygon. For example, the polygons 520 may be generated using block B544A-B544E, described herein.

The method 540, at block B544A, includes identifying first vertices that correspond to a boundary within the environment. For example, the first vertices 502 may be identified. The identification may be as a result of generation of the first vertices 502 using one or more programs, a result of data representing locations of the first vertices 502 being received, and/or another method.

The method 540, at block B544B, includes generating polylines between adjacent first vertices. For example, the first polylines 516 may be generated by extending line segments between each of adjacent vertices 502A and 502B, 502B and 503C, and 502C and 502D, and so on.

The method 540, at block B544C, includes generating second vertices adjacent the first vertices spaced along a direction perpendicular to the first polyline. For example, the second vertices 504 may be generated adjacent the first vertices, and may be spaced from the first vertices 502 along a direction perpendicular to the first polylines 516.

The method 540, at block B544D, includes generating a second polyline extending between the second vertices. For example, second polylines 522 may be generated that extend between each of the adjacent second vertices 504.

The method 540, at block B544E, includes generating third polylines extending between corresponding first vertices and second vertices. For example, the third polylines 524 may be generated to extend between adjacent first vertices 502 and second vertices 504.

Figure 6A:
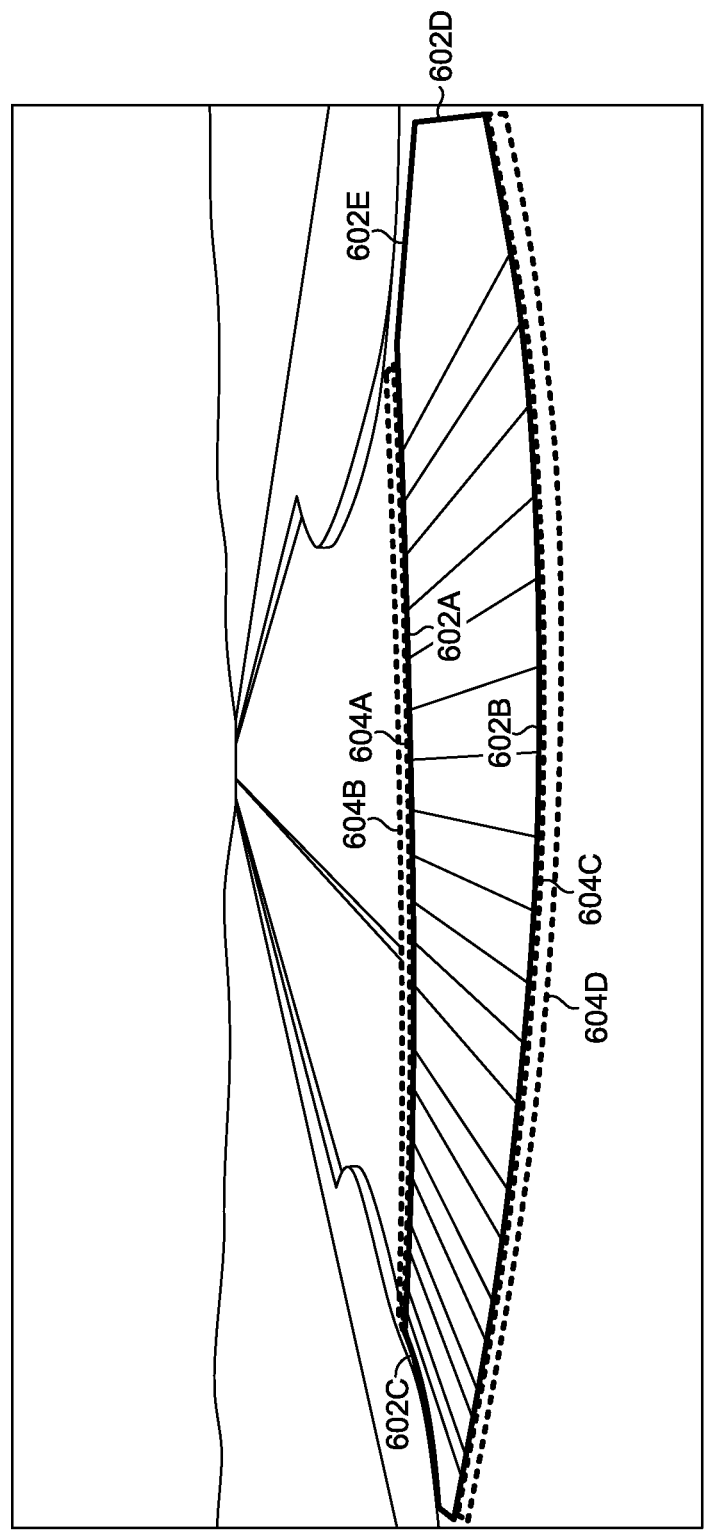
FIG. 6A is an illustration of an example crosswalk and intersection annotation, in accordance with some embodiments of the present disclosure.

Referring to FIG. 6A, FIG. 6A is a diagram illustrating an example crosswalk and intersection annotation, in accordance with some embodiments of the present disclosure. The machine learning model(s) 108 may be trained to detect combined crosswalks and intersections by annotating the regions corresponding to the crosswalk and the intersection separately. For example, the crosswalk may be annotated with a "crosswalk" label/class using the solid lines 602A-602E (e.g., which may be polygons generated similarly to the process of FIGS. 5A-5C) surrounding the crosswalk markings in the image. On the other hand, intersection may be annotated with an "intersection" label/class using dotted or broken lines 604A-604D (e.g., which may be polygons generated similarly to the process of FIGS. 5A-5C) separate from the crosswalk annotation lines 602A-602E. In some examples, each intersection line may be labeled individually. For example, 604A and 604B may be labeled as one intersection class, and 604C and 604D may be labeled as another intersection class. In another example, a crossing intersection (e.g., intersection at cross traffic) may be labeled as a separate "cross intersection" class than a through or opposite traffic intersection. As such, the machine learning model(s) 108 may be trained to learn to detect multiple lane and boundary markings even when more than one exists in the same general area with similarly functioning labels. Even though FIG. 6A depicts crosswalk and intersection labeling, this is for example purposes only and is not intended to be limiting.

Figure 6B:
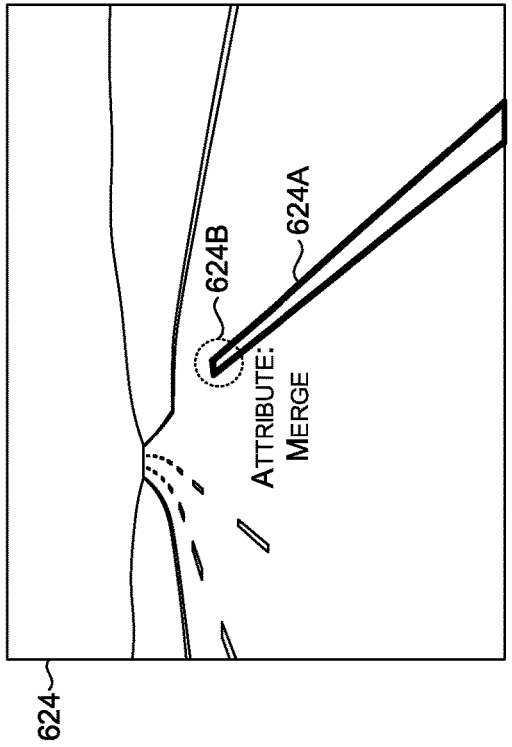
FIGS. 6B and 6C are diagrams illustrating example lane merge annotations, in accordance with some embodiments of the present disclosure.
Figure 6C:
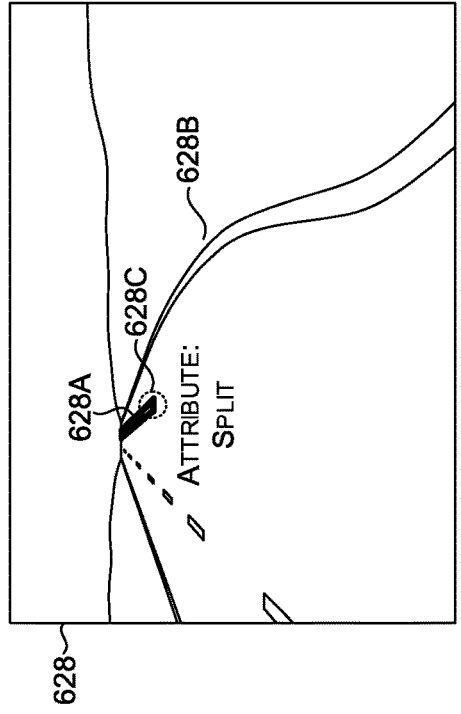

Now referring to FIGS. 6B and 6C, FIGS. 6B and 6C are diagrams illustrating example merge lane annotations, in accordance with some embodiments of the present disclosure. The machine learning model(s) 108 may be trained to detect merge points by associating a merge point 622C and/or 624B to a polygon annotation at the merge point. Merge points 622C and 624B may denote the point where the merge begins (e.g., where lane markings 622A and 622B meet with respect to FIG. 6B, and where lane marking 624A ends with respect to FIG. 6C). A polygon may be generated using method 5C including the merge points. The merge point may be associated with the corresponding polygons 622C and 624B. The machine learning model(s) 108 may learn to detect merge points in real-time by being trained using such annotations.

Figure 6D:
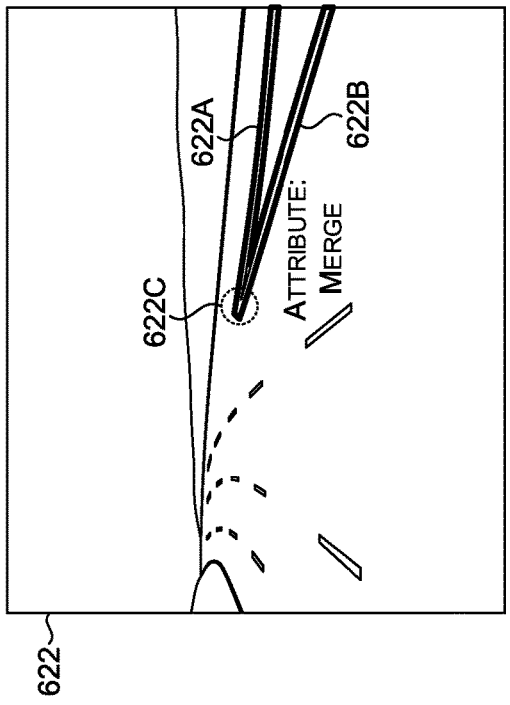
FIGS. 6D and 6E are diagrams illustrating example lane split annotations, in accordance with some embodiments of the present disclosure.
Figure 6E:
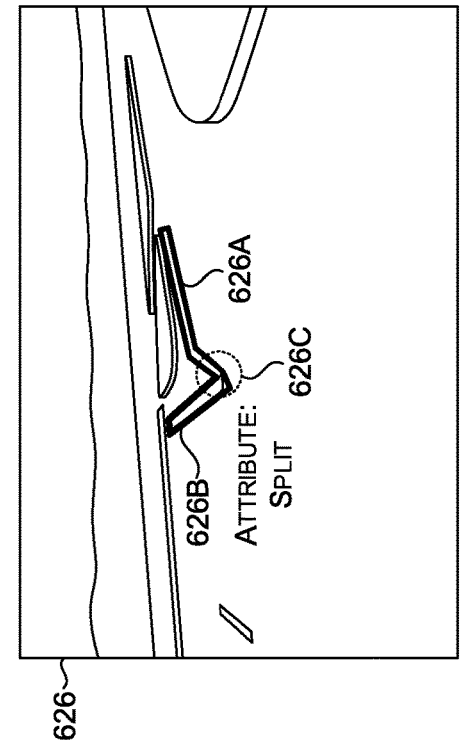

Now referring to FIGS. 6D and 6E, FIGS. 6D and 6E are diagrams illustrating example split lane annotations, in accordance with some embodiments of the present disclosure. The machine learning model(s) 108 may be trained to detect split points by associating a split point 626C and/or 628C to a polygon annotation at the split point. Split points 626C and 628C may denote the point where the split occurs (e.g., where lane markings 626A and 626B merge with respect to FIG. 6D, and where lane marking 628A ends with respect to FIG. 6E). A polygon may be generated using method 5C including the split points. The split point may be associated with the corresponding polygons 626C and 628C. The machine learning model(s) 108 may learn to detect split points in real-time by being trained using such annotations.

Key Performance Indicators (KPI)

End-to-end performance of lane keeping may be evaluated by means of a mean autonomous distance (MAD) metric. The MAD metric is the average distance an autonomous vehicle can drive without requiring human intervention. The MAD metric can be measured by simulating driving on multiple routes, and dividing the distance traveled without requiring human intervention by the number of system failures. In some examples, the MAD metric may be used as a KPI for the systems of the present disclosure. The current system may use KPI's for one or more different intermediate components or modules to allow for isolating failures or problems, quantifying focused improvements, and for quick system iterations.

Figure 7A:
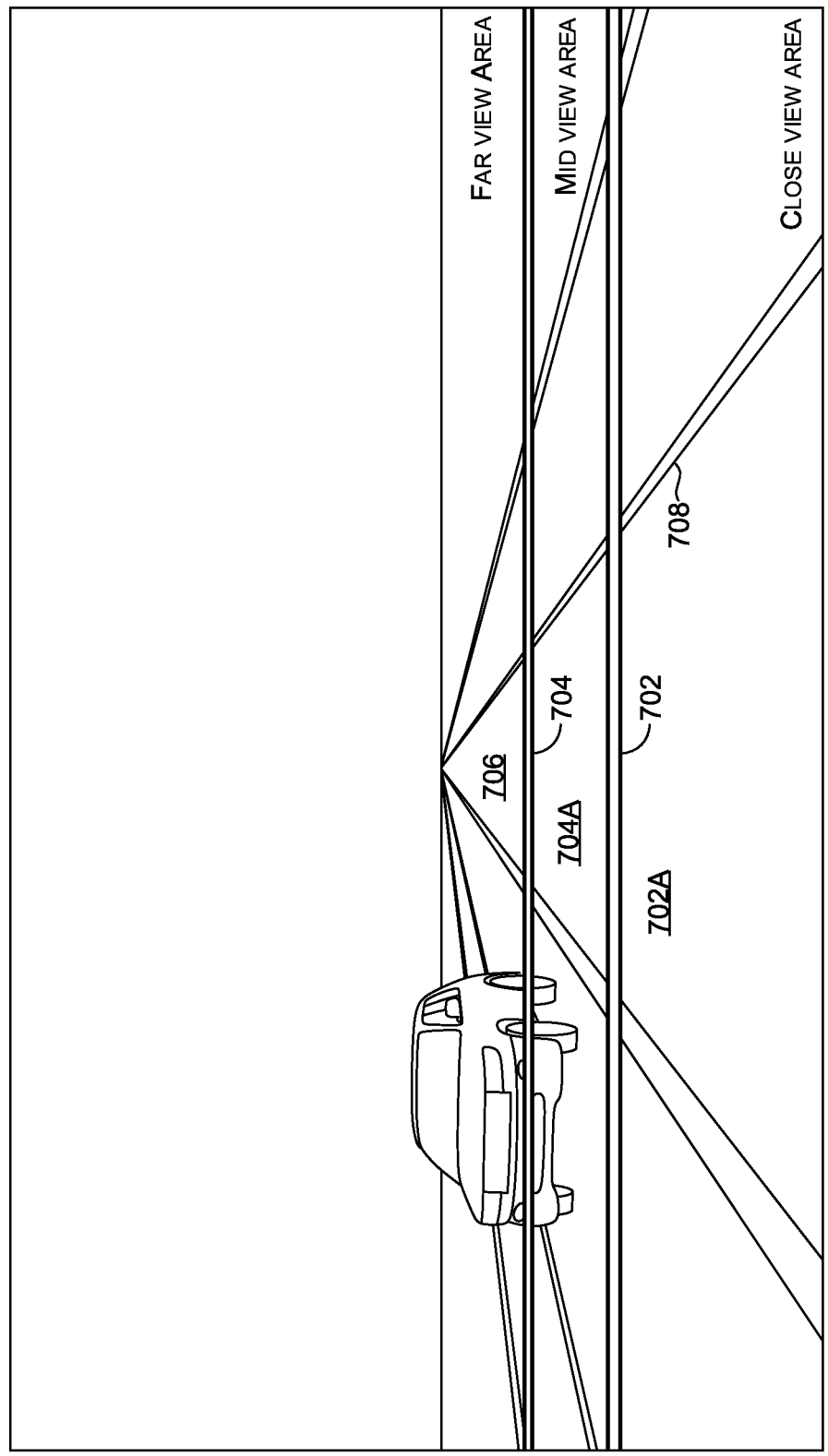
FIG. 7A is an illustration of example performance calculations at different regions of a training image, in accordance with some embodiments of the present disclosure.

For example, referring to FIG. 7A, FIG. 7A is a diagram for an example performance calculation at different regions within a field of view of a sensor, as represented by an image 700. A basic performance metric for a machine learning model output is an fscore of the final output. FIG. 7A illustrates a region fscore metric that may be performed by the current system to determine fscores for different regions within an output of the machine learning model(s) 108 (e.g., different regions of the output segmentation mask(s) 110). The performance of the machine learning model(s) 108 may be calculated at any number of different regions, however the example of FIG. 7A includes three different regions. The three regions may include a close view region 702A, a mid view region 70A, and a far view region 706. This allows the system to measure accuracy with distance earlier in the pipeline than conventional systems. Given a camera lens spec of sensors of the vehicle 800, the row index of the segmentation mask(s) 110 in a perspective view can be translated into the distance in world coordinates (e.g., 3-dimensional real-world coordinates). The segmentation mask(s) 110 may be divided into regions 702A, 704A and 706 in a variety of manners. For example, the segmentation mask(s) 110 may be divided into regions around the vanishing points, with respect to the center part of the road, with respect to the sides of the road, ROI regions, etc. Two or more division methods may be combined to divide the segmentation mask(s) 110 into regions as well. An fscore of each region may be calculated separately for accuracy.

Figure 7B:
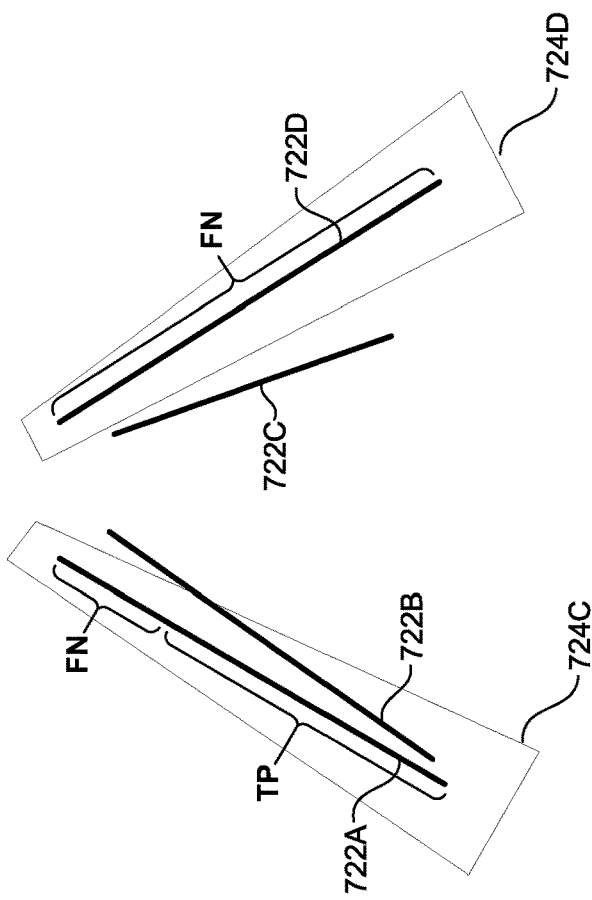
FIG. 7B is an example illustration of a two-dimensional (2D) KPI measurement using lane detection and ground truth polyline points, in accordance with some embodiments of the present disclosure.
Figure 7B:
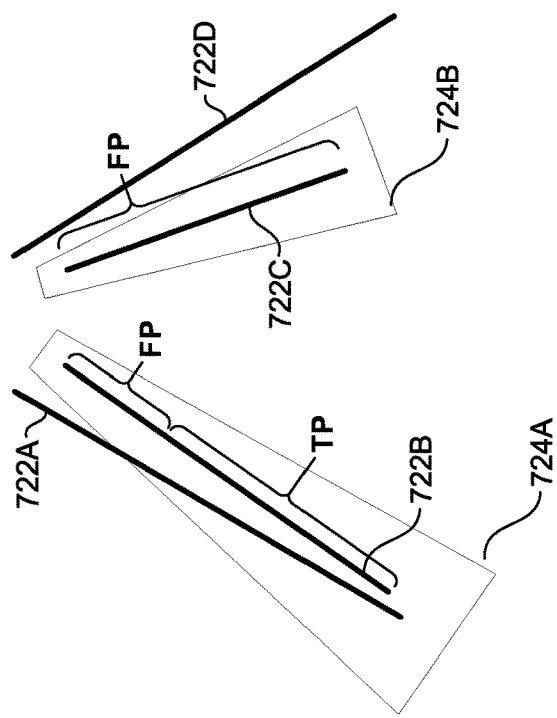

Not referring to FIG. 7B, FIG. 7B is a diagram illustrating a two-dimensional (2D) KPI measured from lane detection and ground truth polyline points, in accordance with some embodiments of the present disclosure. The 2D KPI may be defined with respect to precision, recall, and average closest point distance measured between detection polyline points and ground truth polyline points for each label in labels 308. The detection points may be generated by resampling 112 of the segmentation mask(s) 110. The ground truth polyline points may be points generated via online data augmentation 316. A distance threshold function may be utilized to determine the closest point distance. In one example, the distance threshold function may be an algorithm defined as a function of image row. For each region 702A, 704A, and 706, average closest point distance between corresponding pixels of polylines in the ground truth (e.g., 722A, 722D) and the detection (e.g., 722B, 722C) may be calculated. If the average closest point distance is less than a distance threshold (e.g., 724A, 724B, 724C, and 724D) calculated using the distance threshold function, the precision test may be determined to be successful. However, if the average closest point distance is more than the distance threshold, the precision test may be determined to be unsuccessful. This same procedure may be followed to compute recall, with a distance threshold based on recall distance on the ground truth side. The precision and recall tests may be performed in each of the three regions of the image(s).

Figure 7C:
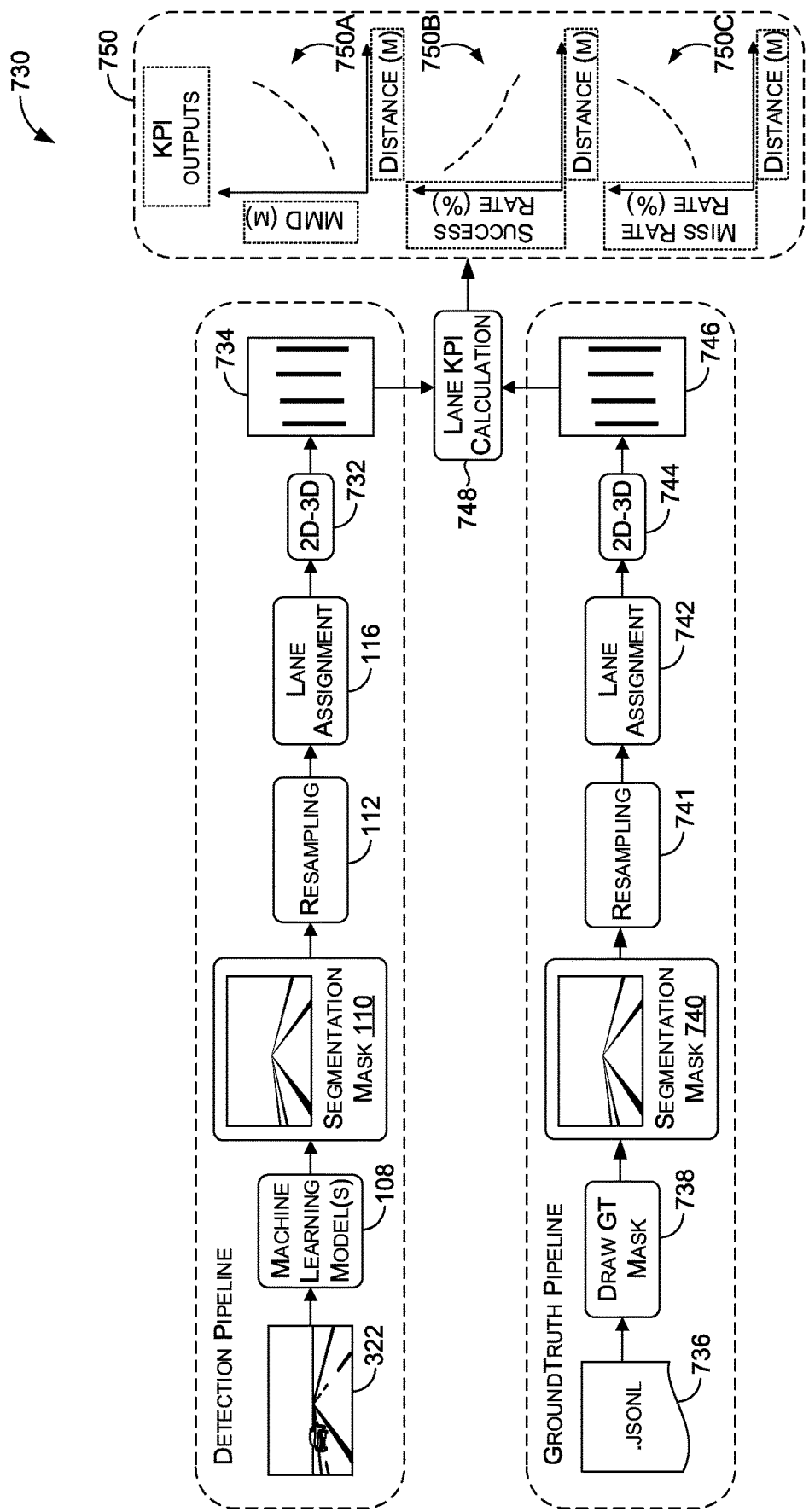
FIG. 7C is a diagram illustrating a three-dimensional (3D) KPI measurement using lane detection and ground truth polyline points, in accordance with some embodiments of the present disclosure.

Referring to FIG. 7C, FIG. 7C is a data flow diagram illustrating a three-dimensional (3D) KPI measured from lane detection and ground truth polyline vertices (or points) in accordance with some embodiments of the present disclosure. The 2D pixel locations in both the ground truth mask 744 (e.g. 414, 418, 426, etc.) and the detection masks 732 may be converted to 3D real-world coordinates (e.g., GPS coordinates, GNSS coordinates, etc.). A mean minimum distance metric may be used to measure KPIs in the three regions of the lane detection masks. The mean distance metric may indicate the relativity of matching pixel points (or vertices) in ground truth and prediction. At the time of converting the 2D pixel locations to 3D real-world coordinates, the ground truth polyline vertices and prediction polyline vertices may be connected by lines—such as polynomial lines or clothoid curves. For example, the corresponding pair of ground truth vertices and prediction vertices may be scanned from near to far along the distance in the masks via Lane KPI Calculation 748. If the scanning line is short, meaning, the corresponding points are close in distance, such as within a certain threshold distance, the pair may be determined to be a successful detection. However, if a ground truth intersection with a scanning line is found but the prediction intersection is not, the ground truth point may be determined to be a false detection. The Lane KPI Calculation 748 may include algorithms to generate KPI outputs 750 with respect to distance. In some examples, one or more of MMD 750A, success rate 750B, and miss rate 750C may be determined with respect to distance, as illustrated in KPI outputs 750. Success rate 750B may be calculated as a percentage of successful lane detection points. Miss rate 750C may be calculated as a percentage of missed or failed lane detection points. In a not limiting example, these KPI outputs 750 may be generated for each of the three regions. This may allow for performance calculations in a variety of ways in order to determine early and accurate failures of the separate components of the lane detection system.

Example Autonomous Vehicle

FIG. 8A is an illustration of an example autonomous vehicle 800, in accordance with some embodiments of the present disclosure. The autonomous vehicle 800 (alternatively referred to herein as the "vehicle 800") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824, which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 820 fps, 240 fps, etc., depending on the embodiment. The cameras may be capable of using rolling shutters, global shutters, another type of shutter, or a combination thereof. In some examples, the color filter array may include a red clear (RCCC) color filter array, a red clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS and/or assisted GPS sensors), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for an 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to an 820-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network, which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, WiFi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
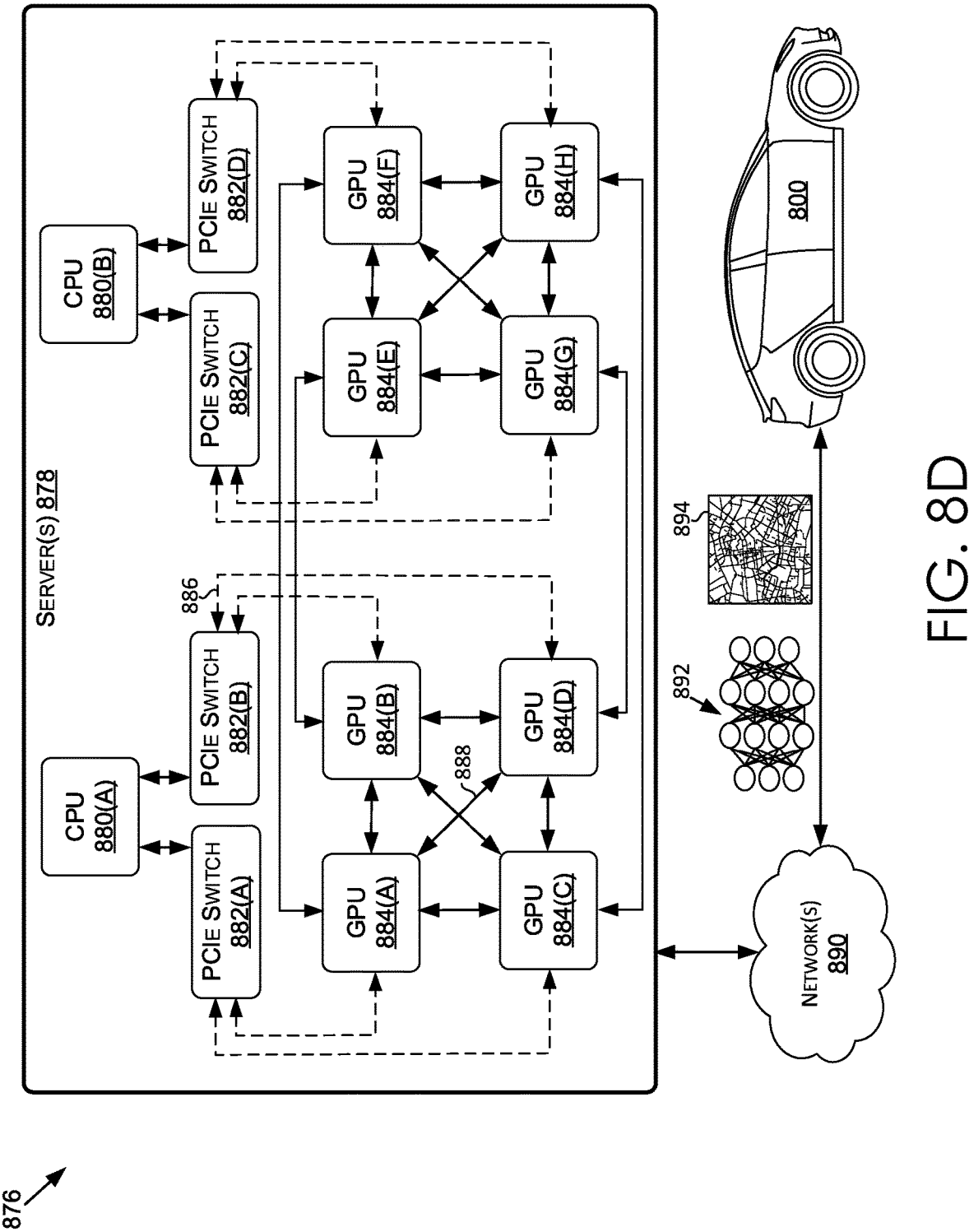
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
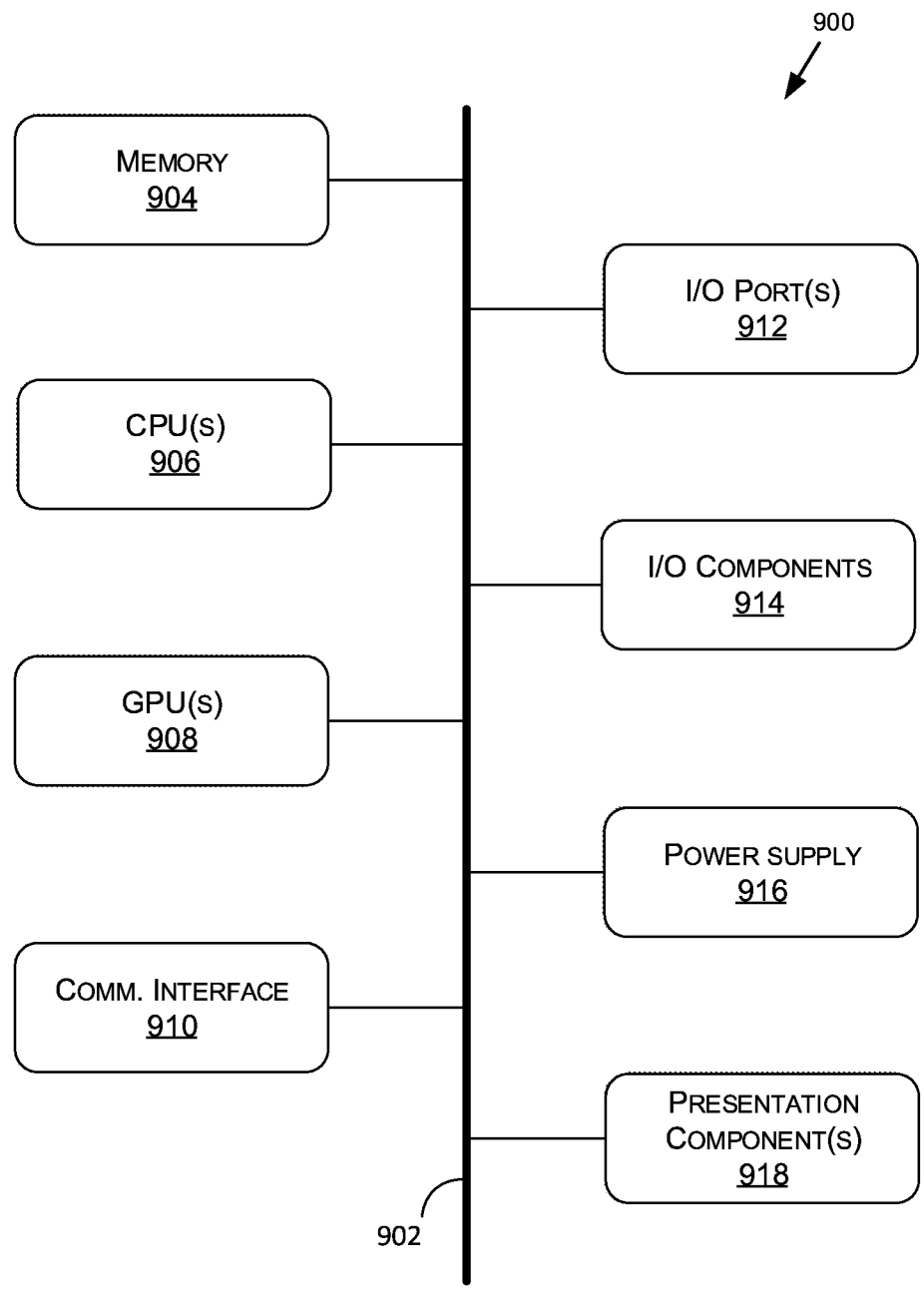
FIG. 9 is an example block diagram for an example computing device suitable for implementation of embodiments of the present disclosure.

FIG. 9 is a block diagram of an example computing device 900 suitable for use in implementing some embodiments of the present disclosure. Computing device 900 may include a bus 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, and one or more presentation components 918 (e.g., display(s)).

Although the various blocks of FIG. 9 are shown as connected via the bus 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The bus 902 may represent one or more busses, such as an address bus, a data bus, a control bus, or a combination thereof. The bus 902 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 906 may be configured to execute the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an ARM processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

The GPU(s) 908 may be used by the computing device 900 to render graphics (e.g., 3D graphics). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data. The display memory may be included as part of the memory 904. The GPU(s) 908 may include two or more GPUs operating in parallel (e.g., via a link). When combined together, each GPU 908 may generate pixel data for different portions of an output image or for different output images (e.g., a first GPU for a first image and a second GPU for a second image). Each GPU may include its own memory, or may share memory with other GPUs.

In examples where the computing device 900 does not include the GPU(s) 908, the CPU(s) 906 may be used to render graphics.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving, from at least one sensor of a vehicle, sensor data representative of an image of a field of view of the at least one sensor;
   applying the sensor data to a neural network;
   computing, by the neural network and based at least in part on the sensor data, a multi-class segmentation mask representative of portions of the image corresponding to at least a first lane marking type and a second lane marking type of a driving surface in the field of view;
   determining lane edges based at least in part on the multi-class segmentation mask;
   performing curve fitting on the lane edges to generate final lane edges;
   identifying for one or more of the final lane edges, at least one lane type corresponding to each final lane edge of the one or more final lane edges, the lane type for any particular final lane edge of the one or more final lane edges being identified based on the relative location of the particular final lane edge with respect to the vehicle; and
   performing one or more operations by the vehicle based at least in part on the final lane edges and the lane types corresponding to the final lane edges.

2. The method of claim 1, wherein the applying the sensor data to the neural network comprises:
   batching a first version of the image from the sensor data with a second version of the image from the sensor data to create a batch; and
   applying the batch to the neural network such that the first version of the image and the second version of the image are applied to the neural network together.

3. The method of claim 1, wherein the portions of the image are pixels, and the multi-class segmentation mask is further representative of each of the pixels of the image corresponding to at least one of the first lane marking type and the second lane marking type.

4. The method of claim 1, wherein the first lane marking type or the second marking type include one or more of a dashed line, a solid line, a yellow line, a white line, an intersection line, a crosswalk line, or a lane split line.

5. The method of claim 1, wherein the portions of the image represented by the multi-class segmentation mask are points, and the determining the lane edges comprises:
   in a unilateral direction, analyzing each point of the points of the multi-class segmentation mask corresponding to the first lane marking type and the second lane marking type by determining whether an adjacent point is from a same lane marking type as the point; and
   grouping the points of the same lane marking type.

6. The method of claim 1, wherein the portions of the image represented by the multi-class segmentation mask are points, and the determining the lane edges comprises:
   in a unilateral direction, analyzing each point of the points of the multi-class segmentation mask corresponding to the first lane marking type and second lane marking type by determining whether an adjacent point is from a same lane appearance as the point; and
   grouping the points of the same lane appearance.

7. The method of claim 1, wherein the portions of the image are points, and the determining the lane edges comprises:
   determining significant points of the points by analyzing the points of the multi-class segmentation mask corresponding to the first lane marking type and second lane marking type based at least in part on their corresponding confidence values as computed by the neural network;
   determining a connectivity score between pairs of the significant points;
   based at least in part on the connectivity score for each of the pairs, identifying candidate edges corresponding to the first lane marking type and the second lane marking type; and
   determining the lane edges from the candidate edges based at least in part on one or more clustering algorithms.

8. The method of claim 1, wherein the performing the curve fitting on the lane edges comprises performing at least one of polyline fitting, polynomial fitting, or clothoid fitting.

9. The method of claim 1, wherein the neural network includes a plurality of convolutional layers and at least one output layer, the at least one output layer including a deconvolutional layer.

10. The method of claim 1, wherein the sensor data is further representative of an additional image, the additional image including a cropped version of the image.

11. The method of claim 1, wherein:
    the image includes a down-sampled version of an original image, and
    the sensor data is further representative of an additional image, the additional image including a cropped version of the original image.

12. The method of claim 1, wherein the multi-class segmentation mask is further representative of confidence scores corresponding to a probability of each of the portions corresponding to at least one of the first lane marking type or the second lane marking type.

13. The method of claim 1, wherein the neural network is trained using a region based weighted loss function.

14. The method of claim 13, wherein the region based weighted loss function results in back-propagation of more error at further distances from a bottom of the image.

15. A method comprising:
    receiving image data representative of an image of an environment; and generating a polygon associated with the image by:
  identifying first vertices that correspond to a boundary within the environment;
  generating first polylines extending between adjacent first vertices;
  based at least in part on the first polylines, generating second vertices adjacent the first vertices, the second vertices being spaced from the first vertices along a direction perpendicular to the first polylines;
  generating a second polyline extending between the second vertices;
  generating third polylines extending between corresponding first vertices and second vertices; and
training a neural network using the image data, the first polylines, the second polyline, and the third polylines as ground truth data.

16. The method of claim 15, wherein a spacing between the second vertices and the first vertices of the polygon is based at least in part on a distance of the first vertices from the bottom of the image.

17. The method of claim 15, wherein the second vertices are generated based at least in part on a distance of the first vertices from the bottom of the image such that the second vertices are spaced closer to the first vertices as the distance of the first vertices from the bottom of the image increases.

18. The method of claim 15, wherein each of the second vertices is generated based at least in part on a slope of a previous first polyline.

19. The method of claim 15, further comprising:
generating a line segment from each polygon; and
masking out the line segment to generate a masked out line segment,
wherein the training the neural network further comprises using the masked out line segment as the ground truth data.

20. A method comprising:
receiving image data representative of an image of a driving surface;
receiving annotations corresponding to locations of at least one of lane markings or boundaries of the driving surface;
applying one or more first transformations to the image to generate a transformed image;
applying one or more second transformations corresponding to the one or more first transformations to each of the annotations to generate transformed annotations; and
using the image, the annotations, the transformed image, and the transformed annotations as ground truth data to train a neural network to identify pixels within images that correspond to at least one of the lane markings or the boundaries.

21. The method of claim 20, wherein the one or more first transformations include one or more of a spatial transformations or a color transformation.

22. The method of claim 20, wherein the at least one first transformation and the at least one second transformation are a same transformation.

* * * * *